United States Patent
VanGilder et al.

(10) Patent No.: US 10,157,245 B2
(45) Date of Patent: Dec. 18, 2018

(54) SYSTEM AND METHOD FOR FLUID DYNAMICS PREDICTION WITH AN ENHANCED POTENTIAL FLOW MODEL

(71) Applicant: American Power Conversion Corporation, West Kingston, RI (US)

(72) Inventors: James William VanGilder, Pepperell, MA (US); Christopher M. Healey, Chelmsford, MA (US); Xuanhang Zhang, Tewksbury, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 347 days.

(21) Appl. No.: 13/665,749

(22) Filed: Oct. 31, 2012

(65) Prior Publication Data

US 2014/0122033 A1 May 1, 2014

(51) Int. Cl.
 *G06F 17/50* (2006.01)
 *H05K 7/20* (2006.01)
(52) U.S. Cl.
 CPC ...... *G06F 17/5009* (2013.01); *G06F 17/5004* (2013.01); *H05K 7/20718* (2013.01);
 (Continued)
(58) Field of Classification Search
 None
 See application file for complete search history.

(56) References Cited

U.S. PATENT DOCUMENTS 5,896,922 A 4/1999 Chrysler et al.
5,978,594 A 11/1999 Bonnell et al.
(Continued)

FOREIGN PATENT DOCUMENTS

CN 102265278 A 11/2011
CN 102414685 A 4/2012
(Continued)

OTHER PUBLICATIONS

S.L Sinha, R.C Arora, Subhransu Roy, Numerical simulation of two-dimensional room air flow with and without buoyancy, Energy and Buildings, vol. 32, Issue 1, Jun. 2000, pp. 121-129.*
Norrefeldt, Victor, Gunnar Grün, and Klaus Sedlbauer. "VEPZO-Velocity propagating zonal model for the estimation of the airflow pattern and temperature distribution in a confined space." Building and Environment 48 (Feb. 2012): 183-194.*

(Continued)

*Primary Examiner* — Omar F Fernandez Rivas
*Assistant Examiner* — Bijan Mapar
(74) *Attorney, Agent, or Firm* — Lando & Anastasi, LLP

(57) ABSTRACT

A system and method for modeling airflow and temperature are disclosed. In one example, the method includes receiving input data related to a physical layout of a facility, dividing, by a computer, a representation of the facility into a plurality of grid cells, identifying where effects of at least one of jet airflow, thermal plumes and buoyancy forces are present in the facility based on the physical layout, specifying a velocity value, using a velocity correction method, for a first set of the plurality of grid cells if the effects of at least one of jet airflow and thermal plumes are present within the first set of the plurality of grid cells, calculating, by the computer, an airflow velocity value for each of a second set of the plurality of grid cells, the second set being different from the first set, modifying the determined airflow velocity value for any of the second set of the plurality of grid cells where the effects of buoyancy forces are present, and storing, on a storage device, the modified airflow values.

18 Claims, 16 Drawing Sheets

(52) U.S. Cl.
CPC ..... *H05K 7/20745* (2013.01); *G06F 2217/16* (2013.01); *G06F 2217/80* (2013.01)

(56) References Cited

U.S. PATENT DOCUMENTS

| | | | |
|---|---|---|---|
| 6,718,277 | B2 | 4/2004 | Sharma |
| 7,031,870 | B2 | 4/2006 | Sharma et al. |
| 7,051,946 | B2 | 5/2006 | Bash et al. |
| 7,085,133 | B2 | 8/2006 | Hall |
| 7,315,448 | B1 | 1/2008 | Bash et al. |
| 7,558,649 | B1 | 7/2009 | Sharma et al. |
| 7,568,360 | B1 | 8/2009 | Bash et al. |
| 7,991,592 | B2 * | 8/2011 | VanGilder et al. ............... 703/1 |
| 8,201,028 | B2 | 6/2012 | Sawczak et al. |
| 8,219,362 | B2 | 7/2012 | Shrivastava et al. |
| 8,229,713 | B2 | 7/2012 | Hamann et al. |
| 8,249,825 | B2 | 8/2012 | VanGilder et al. |
| 8,315,841 | B2 | 11/2012 | Rasmussen et al. |
| 8,509,959 | B2 | 8/2013 | Zhang et al. |
| 2002/0059804 | A1 | 5/2002 | Spinazzola et al. |
| 2004/0240514 | A1 | 12/2004 | Bash et al. |
| 2005/0023363 | A1 | 2/2005 | Sharma et al. |
| 2005/0267639 | A1 | 12/2005 | Sharma et al. |
| 2006/0121421 | A1 | 6/2006 | Spitaels et al. |
| 2006/0168975 | A1 | 8/2006 | Malone et al. |
| 2006/0267974 | A1 | 11/2006 | Kato et al. |
| 2007/0078635 | A1 | 4/2007 | Rasmussen et al. |
| 2008/0055850 | A1 | 3/2008 | Carlson et al. |
| 2008/0104985 | A1 | 5/2008 | Carlsen |
| 2008/0105412 | A1 | 5/2008 | Carlsen et al. |
| 2008/0174954 | A1 | 7/2008 | VanGilder et al. |
| 2009/0205416 | A1 | 8/2009 | Campbell et al. |
| 2009/0223234 | A1 | 9/2009 | Campbell et al. |
| 2009/0326879 | A1 * | 12/2009 | Hamann et al. .................. 703/2 |
| 2009/0326884 | A1 | 12/2009 | Amemiya et al. |
| 2010/0106464 | A1 | 4/2010 | Hlasny et al. |
| 2010/0256959 | A1 | 10/2010 | VanGilder et al. |
| 2010/0286955 | A1 | 11/2010 | VanGilder et al. |
| 2010/0287018 | A1 | 11/2010 | Shrivastava et al. |
| 2011/0040529 | A1 | 2/2011 | Hamann et al. |
| 2011/0246147 | A1 | 10/2011 | Rasmussen et al. |
| 2011/0307820 | A1 | 12/2011 | Rasmussen et al. |
| 2012/0041569 | A1 | 2/2012 | Zhang et al. |
| 2012/0071992 | A1 | 3/2012 | VanGilder et al. |
| 2012/0158387 | A1 | 6/2012 | VanGilder et al. |
| 2012/0170205 | A1 | 7/2012 | Healey et al. |
| 2012/0232877 | A1 | 9/2012 | Bhagwat et al. |
| 2012/0245905 | A1 | 9/2012 | Dalgas et al. |
| 2013/0006426 | A1 | 1/2013 | Healey et al. |
| 2013/0297267 | A1 | 11/2013 | Liang et al. |
| 2014/0358471 | A1 | 12/2014 | VanGilder et al. |

FOREIGN PATENT DOCUMENTS

| | | |
|---|---|---|
| WO | 20050122664 A1 | 12/2005 |
| WO | 2006119248 A2 | 11/2006 |
| WO | 20060124240 A2 | 11/2006 |
| WO | 2007095144 A2 | 8/2007 |
| WO | 2008144375 A2 | 11/2008 |
| WO | 2009/014893 A1 | 1/2009 |
| WO | 2010068434 A1 | 6/2010 |
| WO | 2011/019615 A1 | 2/2011 |
| WO | 2012037427 A1 | 3/2012 |
| WO | 2012082985 A2 | 6/2012 |
| WO | 2012135038 A1 | 10/2012 |

OTHER PUBLICATIONS

Rambo, Jeffrey, and Yogendra Joshi. "Modeling of data center airflow and heat transfer: State of the art and future trends." Distributed and Parallel Databases 21.2-3 (2007): 193-225. (Year: 2007).*

Vangilder, "Real-Time Data Center Cooling Analysis," APC by Schneider Electric, Billerica, MA USA, Electronics Cooling, Sep. 2011, pp. 14-16.

PCT/US2013/067069, International Search Report and Written Opinion, dated Sep. 18, 2014.

Sharma, R.K, Bash, C.E., and Patel, C.D, "Dimensionless Parameters for Evaluation of Thermal Design and Performance of Large-Scale Data Centers." 8th ASME/AIAA Joint Thermophysics and Heat Transfer Conference, Jun. 24-26, 2002. St. Louis, Missouri.

N. Rasmussen, "Cooling Strategies for Ultra-High Density Racks and Blade Servers", White Paper #46, pp. 1-22, American Power Conversion, Mar. 29, 2005, published on World Wide Web.

N. Rasmussen, "Strategies for Deploying Blade Servers in Existing Data Centers", White Paper #125, pp. 1-14, American Power Conversion, Mar. 29, 2005, published on World Wide Web.

K. Dunlap, "Cooling Audit for Identifying Potential Cooling Problems in Data Centers", White Paper #40, pp. 1-18, American Power Conversion, May 20, 2004, published on World Wide Web.

"Management Strategy for Network Critical Physical Infrastructure", White Paper #100, pp. 110, American Power Conversion, Dec. 15, 2003, published on World Wide Web.

Innovative Research, Inc., http://web.archive.org/web/20051221005029/http://www.inres.com/, Dec. 21, 2005, published on World Wide Web.

APC User's Guide Brochure, "InfraStruXure Manager," Mar. 2004, 181 pgs.

Chandrakant D. Patel, et al., "Thermal Considerations in Cooling Large Scale High Copute Density Data Centers" IEEE 2002, pp. 767-776.

ASHRAE, "Thermal Guidelines for Data Processing Environments" 2004, Atlanta: American Society of Heating, Refrigerating, and Air-Conditioning Engineers, Inc., 2004, Atlanta.

N. Rasmussen, "Calculating Total Cooling Requirements for Data Centers", White Paper #25, pp. 1-8, American Power Conversion, May 20, 2004, published on World Wide Web.

Bash, C. E. et al.: "Balance of Power: Dynamic Thermal Management for Internet Data Centers", IEEE Internet Computing , Jan. 1, 2005, pp. 42-49, vol. 9, No. 1, IEEE Service Center, New York, NY.

Shrivastava S K et al., Optimization of Cluster Cooling Performance for Data Centers, Thermal and Thermomechanical Phenomena in Electronic Systems, May 28, 2008, pp. 1161-1166, 11th Intersociety Conference on, IEEE, Piscataway, NJ.

Vangilder, James W. et al., "Real-Time prediction of rack-cooling performance," 2006, ASHRAE Transactions, vol. 112, pp. 151-162.

Vangilder, James W. et al., "Caputure index: an airflow-based rack cooling performance metric," 2007, ASHRAE Transactions, vol. 113, pp. 126-136.

Ahmad, Jasim U. et al., "Navier-Stokes simulation of air-conditioning facility of a large modern computer room," Jun. 2005, Proceedings of the 2005 ASME Fluids Engineering Division Summer Meeting and Exhibition, pp. 1-6.

Dvinsky: "Hot Tips for Using Cooling Software a Little Planning Lets Users Get More from Their Thermal-Simulation Software", Machine Design, Penton Media, Cleveland, OH, vol. 72, No. 4, Feb. 24, 2000.

Abdlmonem H. Beitelmal et al.: "Thermo-Fluids Provisioning of a High Performance High Density Data Center" Distributed and Parallel Databases, Kluwer Academic Publishers, BO, vol. 21, No. 2-3, Apr. 22, 2006, pp. 227-238, XP019499843, ISSN: 1573-7578.

Vangilder et al., "Airflow Uniformity thourhg Perforated Tiles in a Raised-Floor Data Center", White Paper 121, Jul. 17-22, 2005, 10 pages.

Ehsan Pakabaznia et al., "Miminizing data center cooling and server power costs", Proceedings of the 14th ACM/IEEE International Symposium on Low Power Electronics and Design, ISLPED '09, Jan. 1, 2009 (Jan. 1, 2009), p. 145, XP55015368, New York, New York, USA, DOI: 10.1145/1594233.1594268, ISBN: 978-1-60-558684-7.

Jeffrey Rambo et al., "Modeling of data center airflow and heat transfer: State of the art and future trends", Distributed and Parallel Databases, Kluwer Academic Publishers, BO, vol. 21, No. 2-3, Jan. 20, 2007 (Jan. 20, 2007), pp. 193-225, XP019499845, ISSN: 1573-7578, DOI:10.1007/S10619-006-7007-3.

(56) References Cited

OTHER PUBLICATIONS

"Essential Cooling System Requirements for Next Generation Data Centers," White Paper #5, Revision 3, 2003 American Power Conversion, Rev 2002-3, pp. 1-10.
Neil Rasmussen, "Avoidable Mistakes that Compromise Cooling Performance in Data Centers and Network Rooms," White Paper #49, 2003 American Power Conversion, Rev 2003-0, pp. 1-15.
Neil Rasmussen, "Cooling Options for Rack Equipment with Side-to-Side Airflow," White Paper #50, 2004 American Power Conversion, Rev 2004-0, pp. 1-14.
Neil Rasmussen, "Air Distribution Architecture Options for Mission Critical Facilities," White Paper #55, Revision 1, 2003 American Power Conversion, Rev 2003-0, pp. 1-13.
"How and Why Mission-Critical Cooling Systems Differ From Common Air Conditions," White Paper #56, Revision 2, 2003 American Power Conversion, Rev 2003-2, pp. 1-13.
Tony Evans, "Fundamental Principles of Air Conditioners for Information Technology," White Paper #57, Revision 1, 2004 American Power Conversion, Rev 2004-1, pp. 1-9.
Tony Evans, "Humidification Strategies for Data Centers and Network Rooms," White Paper 58, 2004 American Power Conversion, Rev 2004-0, pp. 1-13.
Tony Evans, "The Different Types of Air Conditioning Equipment for IT Environments," White Paper #59, 2004 American Power Conversion, Rev 2004-0, pp. 1-21.
Neil Rasmussen, "Guidelines for Specification of Data Center Power Density," White Paper #120, 2005 American Power Conversion, Rev 2005-0, pp. 1-21.
"Enthalpy" Published by the National Aeronautics and Space Administration and edited by Tom Benson. Retrieved on Jul. 13, 2009 from http://www.grc.nasa.gov/WWWK-12/airplane/enthalpy.html, pp. 3.
Le et al., "Operating Behaviour of Single Split Coil Systems Under Modulating and Two-Position Control", Published 2005 by American Society of Heating, Refrigerating and Air-Conditioning Engineers, Inc.
Vanessa Lopez et al., "Measurement-based modeling for data centers", Thermal and Thermomechanical Phenomena in Electronic Systems (ITHERM), 2010 12th IEEE Intersociety Conference on, IEEE, Piscataway, NJ, USA, Jun. 2, 2010 (Jun. 2, 2010), pp. 1-8, XP031702357.
Karki et al., "Techniques for controlling airflow distribution in raised-floor data centers," ASME 2003.
"Case Study, Application of TileFlow to Improve Cooling in a Data Center," Innovative Research, Inc., 2004.
Jeonghwan Choi et al., "A CFD-Based Tool for Studying Temperature in Rack-Mounted Servers", IEEE Transactions on Computers, IEEE Service Center, Los Alamitos, CA, US, vol. 57, No. 8, Aug. 1, 2008 (Aug. 1, 2008), pp. 1129-1142, ISSN: 0018-9340, DOI: 10.1109/TC.2008.52.
Shrivastava S.K. et al., "A flow-network model for predicting rack cooling in containment systems", Proceedings of the ASME Interpack Conference—2009: Presented at 2009 ASME Interpack Conference, Jul. 19-23, 2009, San Francisco, California, USA, vol. 2, Jul. 19, 2009 (Jul. 19, 2009), pp. 785-791.
Refai-Ahmed G. et al., "Analysis of flow distribution in power supply using flow network modeling (FNM)", Thermal and Thermomechanical Phenomena in Electronic Systems, 2000, IT HERM 2000, The Seventh Intersociety Conference on May 23, 2000, Piscataway, NJ, USA, IEEE, Piscataway, NJ, USA, vol. 1, May 23, 2000 (May 23, 2000), pp. 90-98, ISBN: 978-0-7803-5912-3.
Toulouse M.M. et al., "Exploration of a potential-flow-based compact model of air-flow transport in data centers", Proceedings of the ASME International Mechanical Engineering Congress and Exposition—2009: Presented at 2009 ASME International Mechanical Engineering Congress and Exposition, Nov. 13-19, 2009, Lake Buena Vista, Florida, USA, vol. 13: New Del, vol. 13, Jan. 1, 2009 (Jan. 1, 2009), pp. 41-50, DOI: 10.1115/IMECE2009-10806, ISBN: 978-0-7918-4386-4.
Vangilder, James, W., et al., "Capture index: an airflow-based rack cooling performance metric," 2007, ASHRAE Transactions, vol. 113, pp. 126-136.
Healey, C., et al., "Potential-Flow Modeling for Data Center Applications," Proceedings of the ASME 2011 Pacific Rim Technical Conference & Exposition on Packaging and Integration of Electronic and Photonic Systems, IPACK2011-52136, Jul. 6-8, 2011.
"Optimizing facility operation in high density data center environments," 2007, Hewlett-Packard Development Company, pp. 1-25.
Bemis et al, Data Center Airflow Modeling: Helps Facilities Planners Make Informed Decisions. Applied Math Modeling Inc. 2009 [retrieved on Apr. 19, 2012). Retrieved from the Internet: <URL: http:I/www.coolsimsoftware.com/wwwrooULinkCiick.aspx?fileticket=r1 SqFUDtRTk%3D&tabid=189> entire document.
Donald L. Beaty et al., "High Density Cooling of Data Centers and Telecom Facilities—Part 2," 2005, ASHRAE Transactions, vol. 111, pp. 932-944.
James W. VanGilder et al., "Partially decoupled aisle method for estimating rack-cooling performance in near-real time," 2007, Proceedings of the IPACK2007 ADME InterPACK07, pp. 781-789.
Roger R. Schmidt et al., "Best practices for data center thermal and energy management-review of literature," ASHRAE Transactions, vol. 112, pp. 206-218 [2007].
Beitelmal et al., "Thermo-Fluids Provisioning of a High Performance High Density Data Center", Apr. 22, 2006, Springer Science and Business Media, Inc, Distributed and Parallel Databases, 21, pp. 227-238 DOI:1 0.1 007/s10619-005-0413-0.
Bejan Convection Heat Transfer, "Free Stream Turbulence," Ch. 8, pp. 282-305.
Chen, Q.and Srebric, J., "Simplified Diffuser Boundary Conditions for Numerical Room Airflow Models," Final Report for ASHRAE RP-1009, Department of Architecture, Massachusetts Institute of Technology, Cambridge, MA, 2000, 181 pages.
Gilbert, R. Validation of Computational Fluid Dynamics Based Data Center Cyber-Physical Models. Arizona State University. May 2012. [Retrieved Feb. 21, 2013].[Retrieved from internet: <URL:http://impact.asu.edu/thesis/Robin_thesis.pdf>]. entire document.
Verhoff, A., The Two-Dimensional, Turbulent Wall Jet with and without an External Free Stream, Office of Naval Research Department of the Navy Contact Nonr 1858(14) in Co-Operation with Bureau of Naval Weapons, Report No. 626, May 1963.
Jack P. Holman: "Chapter 3 Steady-State Conduction" In: "Heat Transfer", 2002, McGraw Hill, XP055273397, pp. 71-130.
Vanessa Lopez et al: "Heat transfer modeling in data centers", International Journal of Heat and Mass Transfer, vo 1 . 54, No. 25, Sep. 15, 2011 (Sep. 15, 2011), pp. 5306-5318, XP028298268, ISSN: 0017-9310, DOI: 10.1016/J.IJHEATMASSTRANSFER.2011.08.012 [retrieved on Aug. 10, 2011].

* cited by examiner

Grid Cell i with its 4 Neighbors in 2D

FIG. 9A  a) BOUNDARY CONDITIONS
FIG. 9B  b) INITIAL NON-MASS-CONSERVING FIELD
FIG. 9C  c) MASS-CONSERVING FIELD AFTER PROJECTION

SYSTEM AND METHOD FOR FLUID DYNAMICS PREDICTION WITH AN ENHANCED POTENTIAL FLOW MODEL

BACKGROUND

Field of the Invention

At least one embodiment in accordance with the present invention relates generally to systems and methods for management and design of heating, ventilating, and air-conditioning systems in buildings and cooling systems in data centers.

Discussion of Related Art

In response to the increasing demands of information-based economies, information technology networks continue to proliferate across the globe. One manifestation of this growth is the centralized network data center. A centralized network data center typically consists of various information technology equipment, collocated in a structure that provides network connectivity, electrical power and cooling capacity. Often the equipment is housed in specialized enclosures termed "racks" which integrate these connectivity, power and cooling elements. In some data center configurations, these rows are organized into hot and cold aisles to decrease the cost associated with cooling the information technology equipment. A raised floor having an air plenum beneath the floor is typically used for providing cooling air to the racks. Cool air is distributed from the air plenum to the racks through perforated tiles having open areas.

Various processes and software applications, such as the data center management systems available from American Power Conversion (APC) Corporation by Schneider Electric of West Kingston, R.I., have been developed to aid data center personnel in designing and maintaining efficient and effective data center configurations. These tools often guide data center personnel through activities such as designing the data center structure, positioning equipment within the data center prior to installation and repositioning equipment after construction and installation are complete. Thus, conventional tool sets provide data center personnel with a standardized and predictable design methodology.

In addition, processes and software applications have been developed for general building design of heating, ventilating, and air-conditioning systems (HVAC systems). HVAC systems may use a multitude of ducts to distribute conditioned air throughout buildings. Depending on the temperature in a room, the HVAC system can adjust the flow of conditioned air into the room. The tools for designing HVAC systems can guide a building designer through activities such as positioning ducts, grills and diffusers within an identified space to provide a comfortable environment for a user of that space.

SUMMARY

According to one aspect, a computer-implemented method for modeling airflow comprises receiving input data related to a physical layout of a facility, dividing, by a computer, a representation of the facility into a plurality of grid cells, identifying where effects of at least one of jet airflow, thermal plumes and buoyancy forces are present in the facility based on the physical layout, specifying a velocity value, using a velocity correction method, for a first set of the plurality of grid cells if the effects of at least one of jet airflow and thermal plumes are present within the first set of the plurality of grid cells, calculating, by the computer, an airflow velocity value for each of a second set of the plurality of grid cells, the second set being different from the first set, modifying the determined airflow velocity value for any of the second set of the plurality of grid cells where the effects of buoyancy forces are present, and storing, on a storage device, the modified airflow values.

In at least one embodiment, the first set of the plurality of grid cells is a null set. In another embodiment, the second set of the plurality of grid cells is a null set. In the method, each of the plurality of grid cells may include a plurality of faces. In some examples, specifying the velocity value may include specifying the velocity value for at least one of the plurality of faces. In other embodiments, the method further includes calculating the airflow velocity value for at least another one of the plurality of faces. In at least one example, specifying the velocity value may include specifying the velocity value for a face aligned with the thermal plume. In one example, the thermal plume is associated with the vertical direction. In another example, specifying the velocity value may include specifying the velocity value for a face aligned with the jet airflow. In one example, the jet airflow is associated with the horizontal direction. In other embodiments, the method further includes calculating the airflow velocity value for at least another one of the plurality of faces.

In the method, calculating the airflow velocity value, further includes calculating the airflow velocity value using a potential flow method. In one example, the method further comprises configuring equipment in the facility based on at least one of the modified airflow values and the specified velocity values. In another example, the method further comprises assessing thermal comfort of a user in the facility based on at least one of the modified airflow values and the specified velocity values. In yet another example, the method further comprises control equipment in the facility based on at least one of the modified airflow values and the specified velocity values.

In another example, the method further comprises calculating, by the computer, a temperature value, based on the airflow velocity value, for each of the plurality of grid cells. In the method, the facility may include a space in a data center and objects in the physical layout include at least one equipment rack and at least one cooling provider. In the method, the facility includes a space in a building and objects in the physical layout include at least one ventilation structure and at least one heat provider. In the method, modifying the determined airflow velocity value may further comprise calculating a buoyant velocity value for any of the second set of the plurality of grid cells, and adding the buoyant velocity value to the determined airflow velocity value.

In the method, specifying the velocity value further comprises calculating a jet airflow velocity value for any of the first set of the plurality of grid cells in a region of influence in the facility, and specifying the jet airflow velocity value for the first set of the plurality of grid cells in the region of influence. In the method, specifying the velocity value may further comprise calculating a halo cell velocity value for any of the first set of the plurality of grid cells adjacent to objects in the facility, and specifying the halo cell velocity value for the first set of the plurality of grid cells disposed adjacent to the objects.

In one example, the method further comprises determining new airflow values for each of the grid cells in the facility, using an iterative method, wherein the new airflow values satisfy a mass balance equation. In at least one example, the iterative method uses a physics-based method configured to convert a non-mass-conserving airflow field to a mass-conserving field while preserving dominant characteristics of the original non-conserving flow field. In some example, the method further comprises determining whether differences between the new airflow values and previous airflow values are greater than a threshold, and repeating the iterative method until the differences are not greater than the threshold.

According to another aspect, a system for modeling airflow, the system including a memory and a processor coupled to the memory and being configured to receive input data related to a physical layout of a facility, divide a representation of the facility into a plurality of grid cells, identify where effects of at least one of jet airflow, thermal plumes and buoyancy forces are present in the facility based on the physical layout, specify a velocity value, using a velocity correction method, for a first set of the plurality of grid cells if the effects of at least one of jet airflow and thermal plumes are present within the first set of the plurality of grid cells, calculate by the computer, an airflow velocity value for each of a second set of the plurality of grid cells, the second set being different from the first set, modify the determined airflow velocity value for any of the second set of the plurality of grid cells where the effects of buoyancy forces are present, and store on a storage device, the modified airflow values.

In at least one embodiment, the first set of the plurality of grid cells is a null set. In another embodiment, the second set of the plurality of grid cells is a null set. In the system, each of the plurality of grid cells may include a plurality of faces. In some examples, specifying the velocity value may include specifying the velocity value for at least one of the plurality of faces. In at least one example, specifying the velocity value may include specifying the velocity value for a face aligned with the thermal plume. In one example, the thermal plume is associated with the vertical direction. In other embodiments, the method further includes calculating the airflow velocity value for at least another one of the plurality of faces. In another example, specifying the velocity value may include specifying the velocity value for a face aligned with the jet airflow. In one example, the jet airflow is associated with the horizontal direction. In other embodiments, the method further includes calculating the airflow velocity value for at least another one of the plurality of faces.

In one example, the system is further configured to calculate the airflow velocity value using a potential flow method. In another example, the system is further configured to configure equipment in the facility based on at least one of the modified airflow values and the specified velocity values. In yet another example, the system is further configured to assess thermal comfort of a user in the facility based on at least one of the modified airflow values and the specified velocity values. In yet another example, the system is further configured to control equipment in the facility based on at least one of the modified airflow values and the specified velocity values.

In one example, the system is further configured to calculate a temperature value, based on the airflow velocity value, for each of the plurality of grid cells. In at least one example, the facility includes a space in a data center and objects in the physical layout include at least one equipment rack and at least one cooling provider. In another example, the facility includes a space in a building and objects in the physical layout include at least one ventilation structure and at least one heat provider.

In some embodiments, the system is further configured to modify the determined airflow velocity value by calculating a buoyant velocity value for any of the second set of the plurality of grid cells, and adding the buoyant velocity value to the determined airflow velocity value. In other embodiments, the system is further configured to specify the velocity value by calculating a jet airflow velocity value for any of the first set of the plurality of grid cells in a region of influence, and specifying the jet airflow velocity value for the first set of the plurality of grid cells in the region of influence.

In one embodiment, the system is further configured to specify the velocity value by calculating a halo cell velocity value for any of the first set of the plurality of grid cells adjacent to objects in the facility, and specifying the halo cell velocity value for the first set of the plurality of grid cells disposed adjacent to the objects. The system may be further configured to calculate new airflow values for each of the grid cells in the facility, wherein the new airflows values satisfy a mass balance equation. In one example, the system is further configured to determine new airflow values for each of the grid cells in the facility, using an iterative method, wherein the new airflow values satisfy a mass balance equation. In at least one example, the iterative method uses a physics-based method configured to convert a non-mass-conserving airflow field to a mass-conserving field while preserving dominant characteristics of the original non-conserving flow field.

According to another aspect, a non-transitory computer readable medium having stored thereon sequences of instruction for modeling airflow is disclosed. In one example, the non-transitory computer readable medium includes instructions that will cause at least one processor to receive input data related to a physical layout of a facility, divide a representation of the facility into a plurality of grid cells, identify where effects of at least one of jet airflow, thermal plumes and buoyancy forces are present in the facility based on the physical layout, specify a velocity value, using a velocity correction method, for a first set of the plurality of grid cells if the effects of at least one of jet airflow and thermal plumes are present within the first set of the plurality of grid cells, calculate by the computer, an airflow velocity value for each of a second set of the plurality of grid cells, the second set being different from the first set, modify the determined airflow velocity value for any of the second set of the plurality of grid cells where the effects of buoyancy forces are present, and store on a storage device, the modified airflow values.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
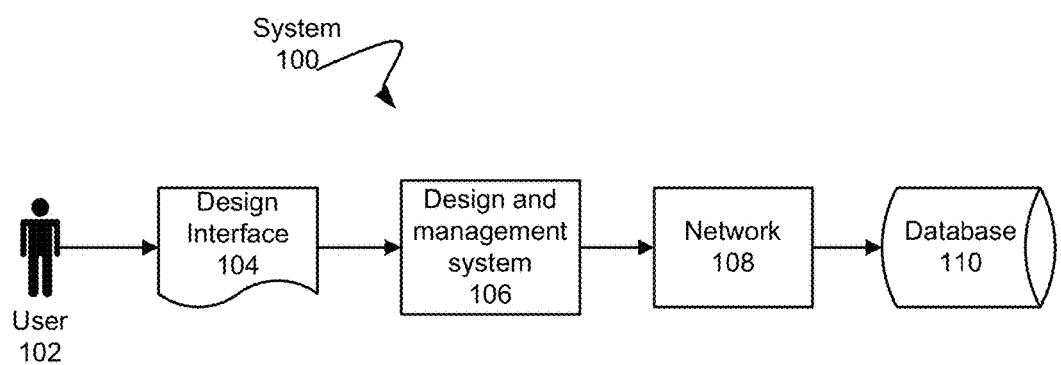
FIG. 1 a schematic of one example of a distributed system including a design and management system.

At least some embodiments in accordance with the present invention relate to systems and processes through which a user may design and analyze data center configurations and building HVAC systems. These systems and processes may facilitate the design and analysis activity by allowing the user to create models of building HVAC systems from which temperatures and airflow may be calculated. Both the systems and the user may employ the calculated temperature and airflow to design alternative configurations for building HVAC systems that provide comfort for the user and data center configurations that meet various design objectives. According to one embodiment, systems and methods described herein can also be applied to other applications including electronics cooling applications and indoor environmental applications including, clean rooms, industrial applications, labs, hospitals and surgical suites.

It is appreciated that simple by-hand calculations and the HVAC design tools available through American Society of Heating, Refrigerating and Air Conditioning Engineers (ASHRAE) and other organizations, are often used to design building HVAC systems for individual spaces that ensure occupant health and comfort. For example, the individual spaces can include an office, a cubicle or a shared space in an office building. However, such tools are typically based on estimations and empirical models that may not encompass the specific details of each individual space. Therefore, the HVAC design tools currently available are intentionally conservative. Consequently, the HVAC systems designed using such tools are often unnecessarily over-designed and unnecessarily costly.

To predict the performance of individual spaces with precision, Computational Fluid Dynamics (CFD) analyses are sometimes used to simulate the airflow patterns, temperatures, and other factors that affect occupant comfort, building energy consumption, and other building characteristics. This information can be used to assess the effectiveness of various HVAC and natural ventilation system designs and to evaluate consequent interior comfort conditions. However, CFD is very expensive, requires an expert operator, and may provide inconsistent predictions depending on the operator and the underlying physical models specific to any given CFD package.

For data center applications, CFD is still the most-widely used tool for predicting airflow and temperatures. However, due to the drawbacks of CFD, Potential Flow Modeling (PFM) analyses have recently been used instead of CFD in some tools. Similar to CFD, PFM provides full 3D predictions of airflow, temperatures, and the complete range of other variables. PFM methods are described in Patent Cooperation Treaty Application No. PCT/US2011/065071, titled "SYSTEM AND METHOD FOR RACK COOLING ANALYSIS," filed Dec. 15, 2011, (referred to herein as "the PCT/US2011/065071 application"), and Patent Cooperation Treaty Application No. PCT/US2012/030373, titled SYSTEMS AND METHODS FOR PREDICTING FLUID DYNAMICS IN A DATA CENTER, filed Mar. 23, 2012, (referred to herein as "the PCT/US2012/030373 application"), each of which is assigned to the assignee of the present application, and each of which is hereby incorporated herein by reference in its entirety.

The PFM method described in the PCT/US2011/065071 application predicts, in real-time, the airflow through inlets and outlets of equipment racks in a data center. The ability to predict performance in real-time or near real-time allows the tool to be used to quickly analyze several possible solutions and consider various design trade-offs. Unlike CFD, the PFM method is based on a much simpler physical model of fluid flow, which can provide several advantages, including being comparatively simple to develop and maintain and comparatively fast, approaching real time for some practical 3D applications. The PFM method may be characterized as stable, because it consistently produces a reasonable result. In addition, the PFM method is easy to use because it does not require an expert operator.

However, in achieving these advantages, the PFM method may ignore some physical effects, such as jet-like airflow patterns. Because the PFM method is typically used in data center applications, the ability to model jet-like airflow is generally less of a concern in data centers. Mainly because jet-like airflows typically only occur in specific scenarios, such as for example, jet flow from a single rack or perforated tile in isolation. For practical setups in which many tiles and many racks are placed adjacent to one another, the combined source results in a much more uniform and less jet-like flow pattern. The PFM method may also ignore other physical effects including buoyancy, for examples in cases of hot air rising to the top of the data center. Accounting for buoyancy forces in data center design can be important to accurately model airflow, specifically, because there is a trend in server design towards higher power and lower airflow. In building design applications, the effects of jet-like flow patterns, thermal halo and effects of buoyancy are particularly important. Because the PFM method may not be as accurate for general building cases, where buoyancy and jet-like flows are significant, the PFM method needs to be enhanced for general building design applications.

Therefore, to meet the needs of the general building design community, there exists a need for a fast, simple, and stable tool that accounts for buoyancy, jet-like airflows and additional heating around objects. The Enhanced-PFM (E-PFM) model disclosed herein mitigates the aforementioned limitations of the PFM method while retaining its strengths. According to various embodiments, by accounting for jet-like flows and buoyancy forces, E-PFM may meet the needs of the general building design applications and provide a relatively simple and stable solution. In various examples, the resulting solution time of E-PFM is only approximately double that of PFM, equal to a small fraction of CFD solution time.

The aspects disclosed herein in accordance with the present embodiments, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

For example, according to one embodiment of the present invention, a computer system is configured to perform any of the functions described herein, including but not limited to, configuring, modeling and presenting information regarding specific data center configurations. Further, computer systems in embodiments may be used to automatically measure environmental parameters in a data center or in a building, and control equipment, such as chillers or coolers, or heaters to optimize performance. Moreover, the systems described herein may be configured to include or exclude any of the functions discussed herein. Thus the embodiments are not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Example System Architecture

FIG. 1 presents a context diagram including physical and logical elements of distributed system 100. As shown, distributed system 100 is specially configured in accordance with the presently disclosed embodiments. The system structure and content recited with regard to FIG. 1 is for exemplary purposes only and is not intended to limit the embodiments to the specific structure shown in FIG. 1. As will be apparent to one of ordinary skill in the art, many variant system structures can be architected without deviating from the scope of the presently disclosed embodiments. The particular arrangement presented in FIG. 1 was chosen to promote clarity. Information may flow between the elements, components and subsystems depicted in FIG. 1 using any technique. Such techniques include, for example, passing the information over the network via TCP/IP, passing the information between modules in memory and passing the information by writing to a file, database, or some other non-volatile storage device. Other techniques and protocols may be used without departing from the scope of the presently disclosed embodiments.

Referring to FIG. 1, system 100 includes user 102, interface 104, design and management system 106, communications network 108 and database 110. System 100 may allow user 102, such as a data center architect or general building designer, to interact with interface 104 to create or modify a model of one or more data center or general building configurations.

In modern data centers, the equipment racks and in-row coolers are typically arranged in rows in an alternating front/back arrangement creating alternating hot and cool aisles in a data center with the front of each row of racks facing the cool aisle and the rear of each row of racks facing the hot aisle, as described in U.S. patent application Ser. No. 12/019,109, titled "System and Method for Evaluating Equipment Rack Cooling", filed Jan. 24, 2008, now U.S. Pat. No. 7,991,592, and in U.S. patent application Ser. No. 11/342,300, titled "Methods and Systems for Managing Facility Power and Cooling," filed Jan. 27, 2006, now U.S. Pat. No. 7,881,910, each of which is assigned to the assignee of the present application, and each of which is hereby incorporated herein by reference in its entirety. Typical equipment racks draw cooling air into the front of the rack and exhaust air out of the rear of the rack. In descriptions herein, equipment in racks, or the racks themselves, may be referred to as cooling consumers, and in-row cooling units and/or computer room air conditioners (CRACs) may be referred to as cooling providers. In the referenced applications, tools are provided for analyzing the cooling performance of a cluster of racks in a data center. In these tools, multiple analyses may be performed on different layouts to attempt to optimize the cooling performance of the data center.

According to one embodiment, interface 104 may include aspects of a data center floor editor and the rack editor as disclosed in Patent Cooperation Treaty Application No. PCT/US08/63675, entitled METHODS AND SYSTEMS FOR MANAGING FACILITY POWER AND COOLING, filed on May 15, 2008, which is incorporated herein by reference in its entirety (referred to herein as "the PCT/US08/63675 application"). In other embodiments, interface 104 may be implemented with specialized facilities that enable user 102 to design, in a drag and drop fashion, a model that includes a representation of the physical layout of a data center or any subset thereof. This layout may include representations of data center structural components as well as data center equipment. The features of interface 104 are discussed further below. In at least one embodiment, information regarding a data center or a building infrastructure is received by the system 100 through the interface, and assessments and recommendations for the data center are provided to the user. Further, in at least one embodiment, optimization processes may be performed to optimize cooling performance and energy usage of the building and/or the data center.

In general building applications, the HVAC systems for an individual room or space may include an inlet through which air is supplied and a return through which air is recirculated to the HVAC system. The individual room may be modeled to include the inlet and return vents in any number of configurations, for example on the bottom or top portion of the room. The individual room may also be modeled to include objects typically located in the room, such as desks, computers, chairs, or human bodies. These objects may be modeled to produce heat and block the flow of air through the room.

As shown in FIG. 1, the design and management system 106 presents design interface 104 to the user 102. According to one embodiment, the design and management system 106 may include the data center design and management system as disclosed in PCT/US08/63675. In this embodiment, the design interface 104 may incorporate functionality of the input module, the display module and the builder module included in PCT/US08/63675 and may use the database module to store and retrieve data.

As illustrated, the design and management system 106 may exchange information with the database 110 via the network 108. This information may include any information needed to support the features and functions of data center design and management system 106. For example, in one embodiment, data center database 110 may include at least some portion of the data stored in the data center equipment database described in PCT/US08/63675. In another embodiment, this information may include any information needed to support interface 104, such as, among other data, the physical layout of one or more data center model configurations, the production and distribution characteristics of the cooling providers included in the model configurations, the consumption characteristics of the cooling consumers in the model configurations, and a listing of equipment racks and cooling providers to be included in a cluster. In one embodiment, data center database 110 may store information pertaining to types of cooling providers, the amount of cool air provided by each type of cooling provider, and a temperature of cool air provided by the cooling provider. Thus, for example, data center database 110 includes records pertaining to a particular type of CRAC unit that is rated to deliver airflow at the rate of 5,600 cubic feet per minute (cfm) at a temperature of 68 degrees Fahrenheit. In addition, the data center database 110 may store information pertaining to one or more cooling metrics, such as inlet and outlet temperatures of the CRACs and inlet and exhaust temperatures of one or more equipment racks. The temperatures may be periodically measured and input into the system, or in other embodiments, the temperatures may be continuously monitored using devices coupled to the system 100.

Data center database 110 may take the form of any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The computer systems shown in FIG. 1, which include the design and management system 106, the network 108 and the database 110, each may include one or more computer systems. As discussed above with regard to FIG. 1, computer systems may have one or more processors or controllers, memory and interface devices. The particular configuration of system 100 depicted in FIG. 1 is used for illustration purposes only and embodiments of the invention may be practiced in other contexts. The embodiments described herein are not limited to a specific number of users or systems.

Potential Flow Modeling (PFM)

Figure 2:
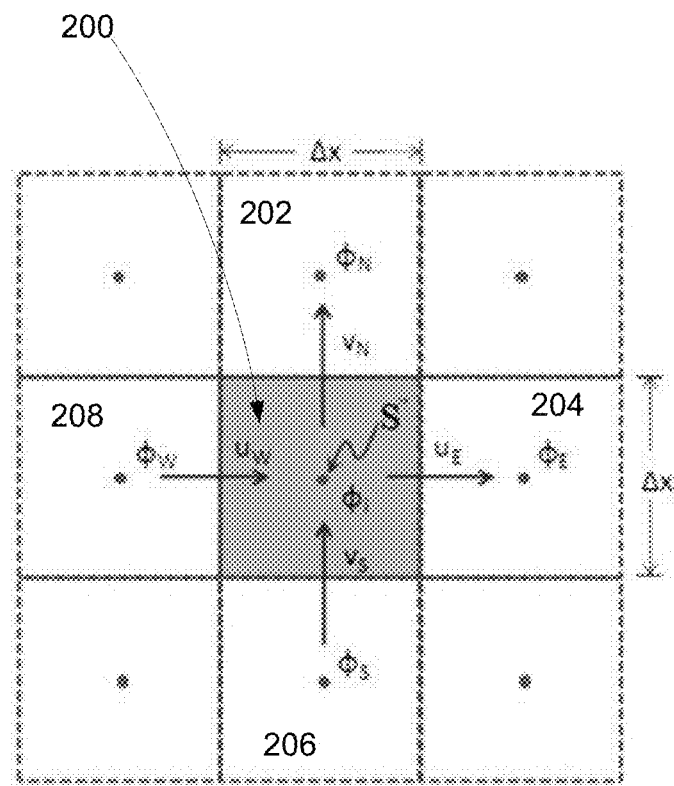
FIG. 2 is a schematic of one example of using of grid cells in accordance with one embodiment.

The PFM method of predicting airflow, temperatures, and other data center performance metrics is discussed with reference to the PCT/US2012/030373 application. The Potential Flow Method is a physics-based technique used in one embodiment to determine velocity potential and temperature in cells of a structured grid arrangement. FIG. 2 shows a 2D uniform, structured grid arrangement 200, with neighboring grid cells 202, 204, 206 and 208 having a dimension $\Delta x$. Airflow may enter or exit each side of the grid cell; additional airflow may be added to or subtracted from the grid cell. However, other grid schemes may be implemented for computational efficiency, and practical simulations can be performed in 3D.

In summary, the PFM method idealizes the airflow as incompressible and irrotational, in which the flow field may be determined from Poisson's Equation:

$$\nabla^2 \varphi = S''' \quad (1)$$

where $S'''$ is a volumetric-flow-rate source per unit volume and $\varphi$ is the velocity potential. The $\varphi$ velocity potential is related to the x, y, and z components of velocity as follows:

$$u = \frac{\partial \varphi}{\partial x} \quad v = \frac{\partial \varphi}{\partial y} \quad w = \frac{\partial \varphi}{\partial z} \quad (2)$$

When discretized for numerical calculation on a computational grid as shown in FIG. 2, the velocity potential at any grid cell i and be written as:

$$\varphi_i = \frac{1}{4}\left(\varphi_N + \varphi_S + \varphi_E + \varphi_W - \frac{S'''}{\Delta x}\right) \quad (3)$$

One such equation can be obtained for $\varphi_i$ at every grid cell and the entire set can be solved simultaneously. As discussed in the PCT/US2012/030373 application, FIG. 2 shows a staggered grid in which scalar values like velocity potential and temperature are computed at cell centers, while velocities are computed at cell faces. Once velocity potentials are determined, velocities may be determined from the appropriate form of Equation (2) written for a discretized computational grid.

No pressure calculations are needed in calculating airflow using PFM. However, a method for coupling pressure to the airflow prediction can be used to model certain flow boundary conditions, such as perforated tiles, that depend on pressure. One such method that uses the Bernoulli Equation is described in U.S. patent application No., PCT/US2011/051866, entitled "SYSTEM AND METHOD FOR PREDICTING PERFORATED TILE AIRFLOW IN A DATA CENTER," filed Sep. 16, 2011, which is incorporated herein by reference in its entirety. Once the airflow velocities are determined, temperatures may be determined using the energy Equation (4).

$$\vec{V} \cdot \nabla T = \alpha_t \nabla^2 T \quad (4)$$

where $\alpha_t = k/(\rho c_p)$ is the thermal diffusivity. In practice, the diffusion term on the right-hand side of Equation (4) can be neglected in favor of the dominant convection terms; however, retaining the diffusion term adds the additional degree of freedom, $\alpha_t$, which could be "tuned" to affect the accuracy of the predictions from the PFM.

The PFM method described above divides the physical problem space to be analyzed into a number of grid cells. In some examples, a structured Cartesian grid is employed. In other examples, the grid is unstructured. Methods and systems for automatically generating an unstructured grid and further interpolating field values within the unstructured grid are discussed in the PCT/US2012/030373 application.

Enhanced PFM

As discussed above, the Enhanced PFM is a method designed to improve the accuracy of PFM simulations discussed in the PCT/US2012/030373 application. The PFM is enhanced by adding one or more corrective methods to the base PFM method including the jet model, the halo cell velocity method, and the buoyancy correction method described below. In the embodiments described herein, the jet model and halo cell velocity methods impose flow patterns that the physics of potential flow does not capture. By specifying fixed flows in the PFM model, jet flow and buoyant plumes can be created within PFM. In turn, the buoyancy correction method, in the embodiments described herein, couples a calculation of the buoyant force at every cell with an innovative projection step to achieve a mass balance and to further achieve proper airflow and temperature fields. It is appreciated that the jet models and halo cells velocities methods may be implemented prior to solving the initial PFM model. In addition, the projection step associated with buoyancy correction may need a solution of another set of equations, as described below, in addition to the PFM model.

In some embodiments described herein, the Enhanced PFM uses empirically-determined velocities as internal boundary conditions. Traditionally, velocities are only specified or fixed at fluid solid interfaces and all velocities in the interior of the fluid are computed. For example, in using traditional methods, velocities at supply grills, equipment rack inlets or outlets may be specified. In contrast, in various embodiments described herein, the computer system using the Enhanced PFM method specifies interior velocities associated with halo cells and jet models to empirically include the effects of physics that are not inherently modeled in PFM such as effects of jet flow, thermal halo and buoyancy.

Figure 3:
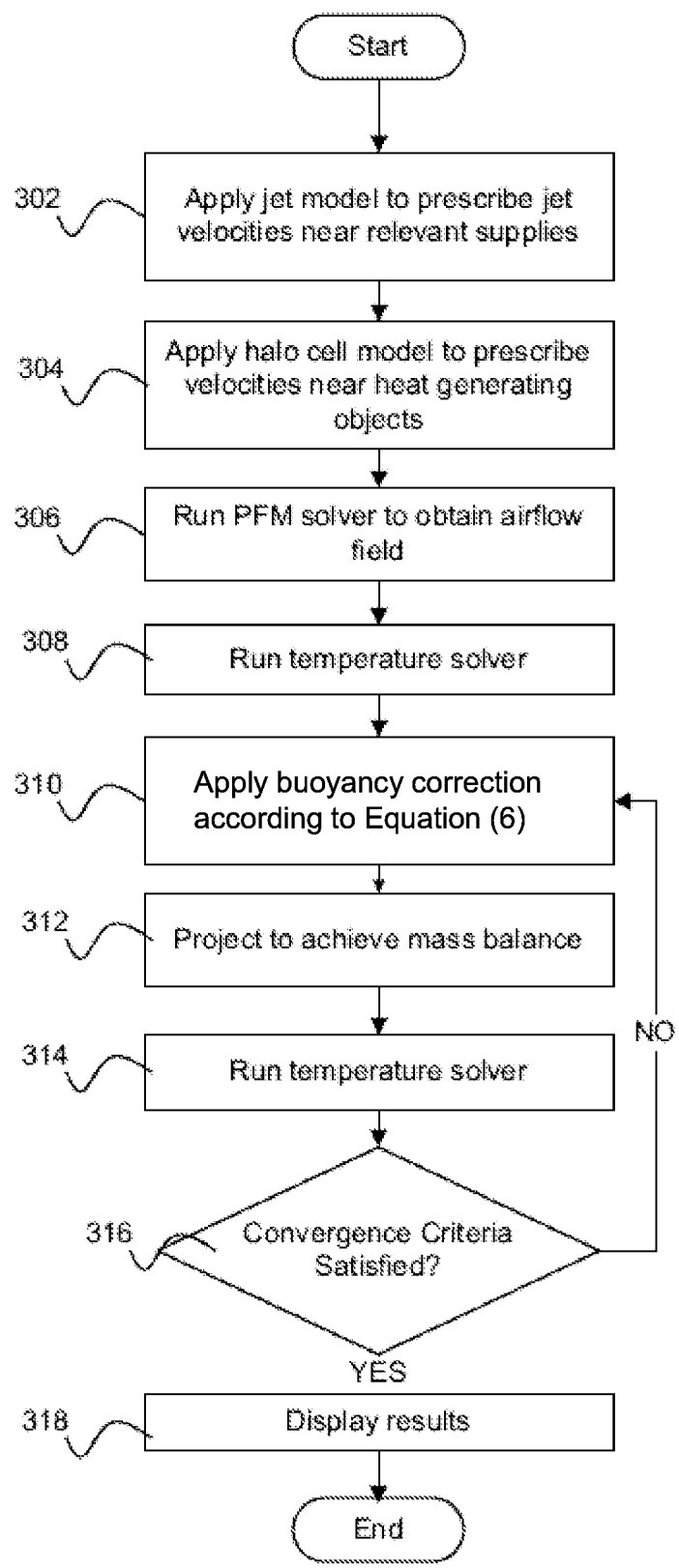
FIG. 3 is a flow diagram of one example process for determining airflows and temperatures in accordance with one embodiment.

A summary of the E-PFM method 300, according to one example, is shown in FIG. 3. According to one example, a computer system, such as the data center design and management system 106 described above, implements the E-PFM method. The example method 300 includes all three correction methods including jet model correction, halo cell correction and the buoyancy correction. It is appreciated that method 300 includes a general case and not all of the three (jet, halo cells, and buoyancy) corrections may be performed for each application. Specifically, in one embodiment, the computer system may perform only jet airflow correction method. For example, a user may want to model air drafts in a room in general building applications. In another embodiment, the computer system may perform only the halo cell correction method. In yet another embodiment, the computer system may perform only the buoyancy correction method. It is understood that the computer system may perform any combination of jet, halo cells, and buoyancy methods.

In one embodiment, the computer system may determine whether or which of the correction methods needs to be performed. In one example, a user enters information in the interface 104 presented by the design and management system 106 specifying conditions necessitating performance of any or all of the methods. For example, the user may specify for the computer system to account for the objects in a facility which act as producers of heat such as, for example, computers and human bodies. The computer system, in this example, may perform the halo cell correction method to account for the presence of these heat producing objects.

In other examples, the computer system may determine the presence or absence of conditions and implement the corresponding correction method. For example, the computer system may determine the presence of a perforated tile in isolation from information regarding the layout of a data center and determine that jet model correction method needs to be performed.

The method 300 may further include a step of receiving information representing the physical layout of an identified area. This layout information may represent a variety of characteristics associated with the area and the objects housed therein. Examples of these characteristics include, among others, the dimensions of the area, walled off portions within the area (referred to herein as cutouts), objects in the area such as desks, chairs, computers, human beings, as well as information pertaining to equipment racks, information technology equipment deployed within the equipment racks, CRACs, UPSs, PDUs, raised floor characteristics, perforated tiles in the room and in-row cooling equipment. The information representing the physical layout may be entered by a user in the interface 104 presented by the design and management system 106 or accessed by the computer system from a storage device containing information pertaining to the layout.

In step 302, if jet-like flows are determined to exist, the computer system imposes the jet velocities in the flow field along with other boundary conditions. As described above, jet-like flows may be determined to exist based on the physical layout of the building or based on inputs from a user. In some examples, the jet-like flows are associated with supply diffusers, free-standing racks, and other airflow suppliers. The boundary conditions can include room inlet and outlet flows, rack supplies and exhausts, as well as other boundaries. As noted above, the jet airflow velocities determined using the jet airflow correction method, described below, may be prescribed prior to determining airflow velocity values using initial PFM models. In at least some examples, the jet airflow velocities may be specified over previously unspecified or undetermined values. In other examples, the jet airflow velocities may replace zero airflow velocity values. In yet other examples, if airflow velocity values were already determined using other methods, the jet airflow correction method may replace the airflow velocity values determined using those methods.

In step 304, the computer system imposes velocities in halo cells adjacent to heat generating objects over velocity values determined using initial PFM models. According to some embodiments, the determination of halo cells and velocity values are described below with reference to FIG. 4 and FIG. 5. In one example, halo cells include computational cells adjacent to solid objects. The computer system can determine and specify (fix) velocities in halo cells to model the thermally-driven buoyant plume surrounding the solid objects. The solid objects, in some examples, can include people, computers, and data center equipment located in a facility. Specified halo cell velocities can be determined through existing analytical or empirical equations in the literature, or can be determined empirically from CFD, as described below.

In one example, the airflow velocities determined for halo cells using the halo cell correction method, described below, may be prescribed prior to determining airflow velocity values using initial PFM models. In at least some examples, the airflow velocities determined for halo cells may be specified over unspecified or undetermined values. In other examples, the airflow velocities determined for halo cells may replace zero airflow velocity values. In yet other examples, if airflow velocity values were already determined using other methods, the halo cell airflow correction method may replace the airflow velocity values determined using those methods.

In one embodiment, each grid cell has a velocity value on each face; four faces in a 2D model having four velocities and six faces in a 3D model having six velocities. With the halo correction, in at least one embodiment, the computer system specifies the component of velocity aligned with the buoyant plume (vertical direction). With the jet correction method, the computer system specifies the component of velocity normal to the face of the supply (horizontal direction). The other components of velocity can be left "free" to be computed by computer system using the PFM method in step 306. These "free" components of velocity can potentially be modified by the projection step 312, as described below. In step 306, the computer system performs the PFM method to obtain airflow fields as described in the PCT/US2012/030373 application and summarized above. In one example, the computer system first solves the velocity potential equations of the grid cells until satisfying a specified mass balance error threshold, which is a function of the total room airflow. Once the velocity potential field is determined, the computer system next determines velocities.

In step 308, the computer system, using a temperature solver, determines temperature values, as described in the PCT/US2012/030373 application. In one embodiment, the computer system solves the temperature equations of the grid cells iteratively, using the calculated grid cell boundary velocities, until satisfying a specified energy balance error threshold, which is a function of the total energy added to the room. Alternatively, the computer system may solve the temperature equations of the grid cells iteratively, using the calculated grid cell boundary velocities, until the difference between the rack loads and the cooler return loads satisfies a specified error threshold of the total energy added to the room. In at least some examples, determining temperature values may be optional.

In step 310, the computer system applies a buoyancy correction method, which adds an additional velocity to each internal grid cell based on local cell temperature. The buoyancy correction in step 310 may upset the mass-conserving nature of the flow field. Therefore, in step 312, a projection step is performed to correct mass imbalance. Complimentary to the jet-airflow and halo cell correction methods, the computer system using the buoyancy correction method adjusts the flow field everywhere except areas where jet or halo-cell velocities are specified. Also, unlike the other two correction techniques, the buoyancy airflow velocities are added to (rather than replace) the velocities predicted by the computer system using the PFM method. The computer system may optionally determine temperatures for each grid cell in step 314 based on airflow velocity values determined using the buoyancy correction method.

Finally, in step 316, the computer system applies multiple buoyancy corrections, with each buoyancy correction followed by a projection step 312, until a mass-conserving flow field is obtained. The buoyancy correction step 310, projection step 312 and temperature solver 314 may be repeated any number of times. In some examples, the steps 310, 312 and 314 may be repeated a set number of times, with one step providing the least computational time.

According to some examples, a computer system, such as the design and management system 106 described above, may implement a process that determines and displays airflow and temperature values, determined above in method 300, using a 2D or a 3D visualization tool. According to at least one example, the temperatures and airflow values may be displayed in a 2D cross sectional area extending through an area such as a data center or a room in a building. In other examples, the temperatures and airflow values may be displayed in a 2D plane extending across the area within a 3D representation of the area, as further described in the PCT/US2012/030373 application.

Specified Jet Airflow

Figure 4:
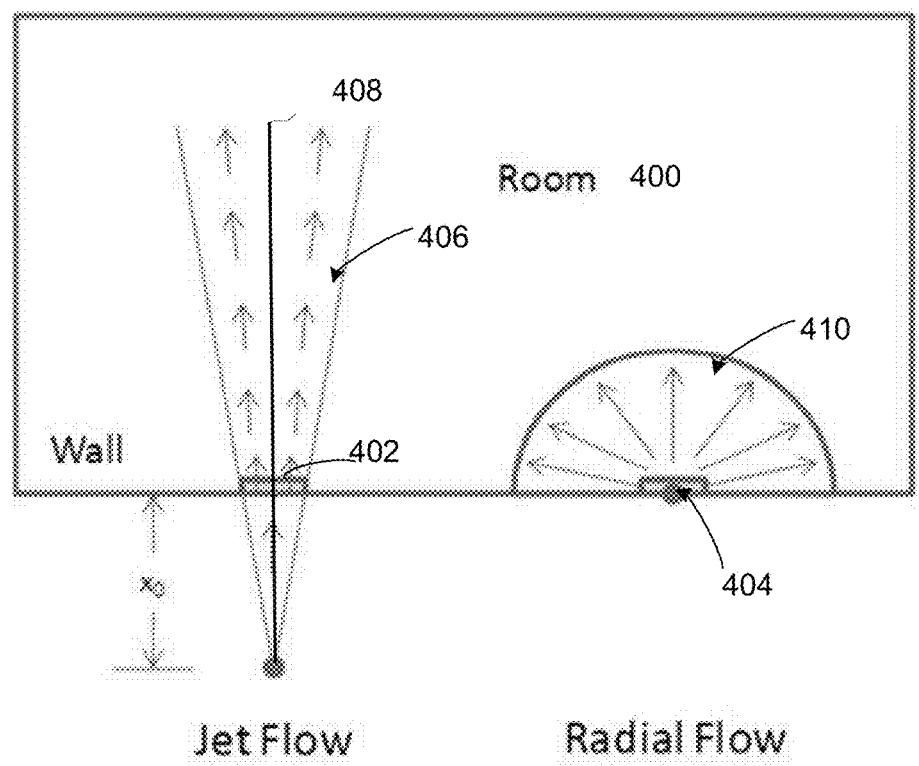
FIG. 4 is a schematic of one representation of different airflows.

The jet velocities from jet-like flows determined in step 302 are described below with reference to FIG. 4 and FIG. 5. FIG. 4 shows a conceptual difference between jet and radial airflow in an idealized room 400. The air can be supplied to rooms through various types of inlets such as, for example, ceiling diffusers and grilles.

Due to momentum, the airflow patterns near an inlet and (or supply) are not simply the reverse of that near an outlet (or return) where flow is drawn out fairly uniformly from all directions. Instead, inlet airflow 402 is jet-like, as shown by the jet 406 in FIG. 4. The jet-like airflow, in one example, is one where the velocity is high and fairly constant along the centerline of the flow axis 408. In addition, the airflow pattern spreads only minimally and maintains a sharp jump in velocity across the jet boundary. The PFM method described above does not directly account for momentum of airflow and therefore produces a radial pattern 410 at the inlet 404 as shown in FIG. 4. The jet-like airflow is generally seen in general building applications and in some examples, is also observable in data centers. The jet airflow correction method, as described below, empirically prescribes modifying the jet like flow pattern by specifying in the resultant simulation the airflow just downstream of the air supply.

Figure 5:
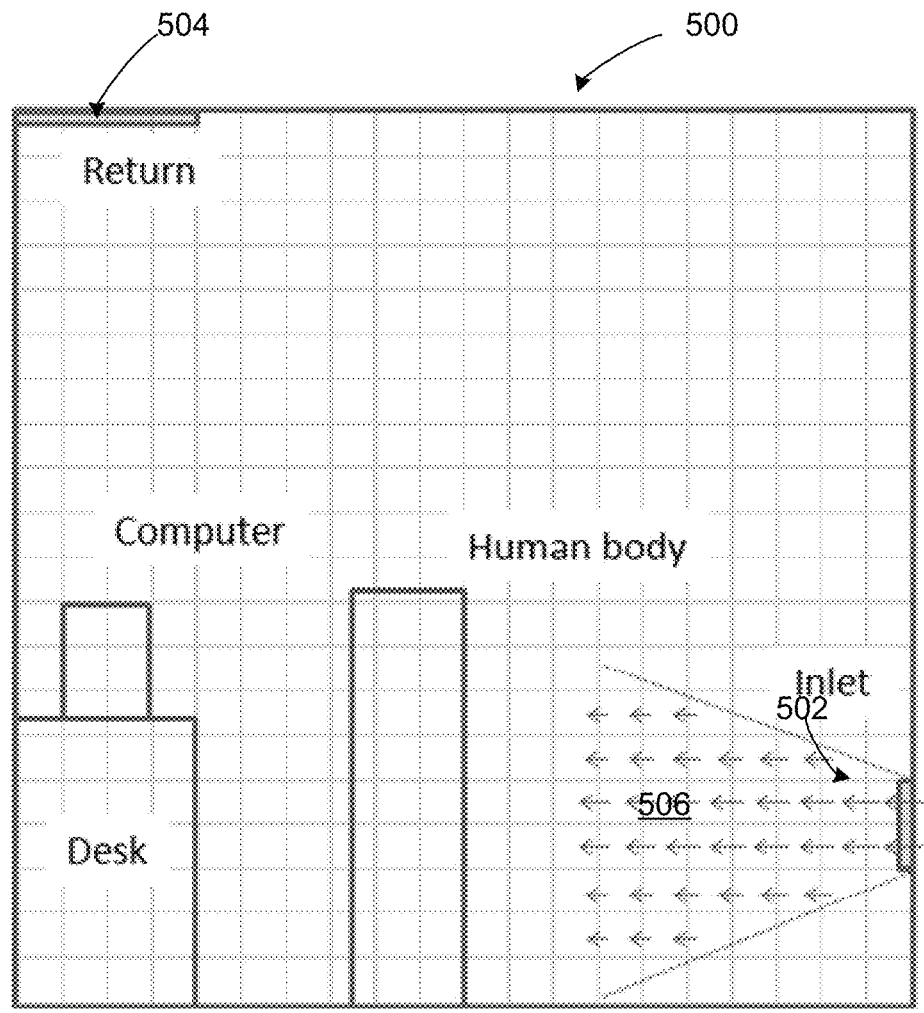
FIG. 5 is a schematic of one layout of a room including modeled jet airflow in accordance with one embodiment.

FIG. 5 represents a visualization of an idealized room 500 in an office space, which includes various physical objects such as a desk, a human body, and a computer. The airflow enters through an inlet 502, and may be at least partially removed through a return 504. The area 506, in one example, represents a region of influence associated with the airflow jet. The region of influence includes a number of cells, each having a velocity associated with it. Using a set of jet formulas, the velocity of the cells within the region of influence, parallel to the jet direction, of all the jets can be determined. The region of influence can be determined in one example, by determining the cells where the velocity is greater than 20% of original jet velocity determined using the PFM model. The velocity values within the region of influence, determined using one of the jet models described below, can be imposed in the numerical airflow simulations.

In various examples, the computer system can treat the predefined jet boundary cells as fixed velocity boundaries along the major flow axis and then compute the rest of the flow field to generate a mass-balanced airflow field. If jet air streams collide, the specified jet velocity may overlap in some of the cells. The velocities can be superimposed on top of each other and the resulting velocity can be calculated from simple algebra. The PFM solver then automatically captures the rest of the flow field by enforcing mass conservation.

The jet-like flow can be specified by the computer system using one or more models that could be used within the E-PFM method. In one embodiment, such as floor/ceiling plenum applications, the computer system uses a 2D jet model. A 2D jet is modeled as a line source of airflow which originates from a fictitious point outside the domain boundary, shown in FIG. 4. The 2D jet airflow pattern as shown in FIG. 5 can then be determined analytically using standard methods described in *Convection Heat Transfer* by A., Bejan. John Wiley and Sons, New York. 1984. The process involves writing the 2D momentum equation with simplifications appropriate to the features of jet flow. This equation can be solved in closed-form to yield the jet-axis airflow velocities. Airflow velocities in the direction perpendicular to the flow axis can be determined from the known jet-axis velocities and the conservation of mass.

In another embodiment, to model a 3D room (office, data center, etc.), the computer system can use a 3D jet model. A simplified isothermal axisymmetric 3D jet model is the most practical, in which the jet supply air temperature is equal to the ambient room air temperature and the jet velocity profile is symmetric along the jet direction. The 3D jet model is described in *A New Method to Describe the Diffuser Boundary Conditions in CFD Simulation*, by Huo, Y., Zhang, J., Shaw, C., and Haghighat, F., 1996. Proc. of ROOMVENT '96, Vol. 2, pp. 233-240.

In a further embodiment, when the jet is attached to a surface and the jet airflow is affected by nearby obstructions (e.g. walls), an "attached jet" model should be used. Methods of computing velocities for an isothermal attached jet are described in *The Two-dimensional Turbulent Wall Jet with and without an External Stream* by Verhoff, A. 1963., Report 626, Princeton University.

In yet a further embodiment, the computer system can obtain an effective jet from empirical models generated from CFD simulations of various practical applications. To train an empirical model for jet-like flow, simulations can be performed for different conditions such as discharge velocities, jet sizes, jet directions, proximity to walls and other objects, etc. The velocity field along the jet direction would be monitored and used to generate and train empirical models by, for example, tuning the coefficients associated with the velocity fields. The empirical model can then be incorporated into PFM solver to specify jet velocity profiles in the computational domain, similar to the other jet models described above.

Specified Halo Cell Velocity

The halo cell velocities, determined in step 304, are described below with reference to FIG. 6 and FIG. 7. The computer system using the PFM method, described in the PCT/US2012/030373 application, may not include the thermal plumes driven up by the heat generated near objects. These objects can include any objects such as computers, people, PDUs, as well as other objects. In the embodiments described herein, to increase the accuracy of the airflow solver, a halo cell model is used to incorporate buoyancy effects.

Figures 6A, 6B:
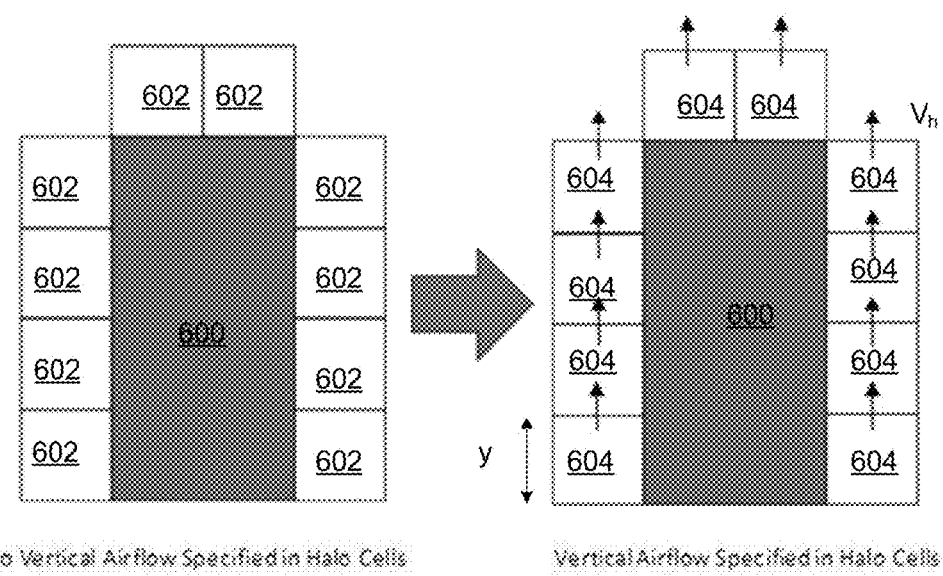
FIG. 6A is a schematic of one heated block including halo cells disposed adjacent to the heated block.
FIG. 6B is a schematic of one heated block including modeled halo cells having vertical airflow specified in accordance with one embodiment.

It is appreciated that ambient air heated up by the objects rises due to buoyancy and therefore creates an additional velocity increase (or "kick") near the air-solid boundaries. To model the thermal plume, the concept of halo cells is introduced. In one example, halo cells can include computational cells immediately surrounding heated objects. The velocity of all the halo cells can be calculated according to an empirical formula and the vertical velocity field (aligned with buoyancy) can be prescribed as boundary conditions before the PFM solver starts. FIGS. 6A and 6B illustrate an object 600, represented as a heated block and includes halo cells 602 and 604. FIG. 6A illustrates the halo cells 602 without vertical airflow specified, while FIG. 6B illustrates the halo cells 604 having a vertical airflow field specified. Each of the halo cells 604 has a location, and each of the vertical airflow field has a velocity $V_h$. In one example, location of the halo cell is defined by the height of the cell (y), in terms of distance from the floor.

Similar to the jet airflow calculated above, the computer system using PFM method may treat the halo cell velocities as fixed velocity boundaries. The computer system using the halo cell velocity method ensures that the correct y-velocity field is preserved near the heated block and then uses the PFM solver to calculate the rest of the flow field. As with the jet model, the PFM solution "around" the specified velocities automatically results in a proper mass-conserving field.

To determine a model for velocity "kicks" determined for the halo cells, a new empirical model is defined for efficiently modeling and training the buoyant effects in halo cells using CFD simulations. Typically, the CFD model contains a heated object placed at the center of an empty room with either open or symmetrical boundaries that are sufficiently far away from the object. The room size and ceiling height are varied to capture the behavior of different room configurations. Different shapes and power levels are also modeled to simulate different types of heat generating objects such as computers, human bodies, or PDUs.

The velocities in the halo cells around the heated block are monitored. FIG. 7 shows one example of vertical airflow specification in the halo cells of FIG. 6B. In the example shown in FIG. 7, the representative halo cell velocities are functions of position near the body in the horizontal plane (A, B, or C locations) or height above the floor (y-axis). An example expression to calculate halo cell velocities can be defined as the following:

$$V_h = C_1 y^{C_2} \quad (5)$$

where $V_h$ (m/s) is the halo cell velocity, y (m) is the distance from the floor, $C_1$ and $C_2$ are constants which vary according to the configuration of the room and the properties of the heated objects. For example, for a heated block representing a human being (with a surface area of 1.8 m$^2$) in a typical office room, the constant $C_1$ and $C_2$ can be calculated as:

$$C_1 = 0.0003 \times P + 0.047$$

$$C_2 = 0.62$$

where P is the power (W) generated by the heated block.

Figure 7A:
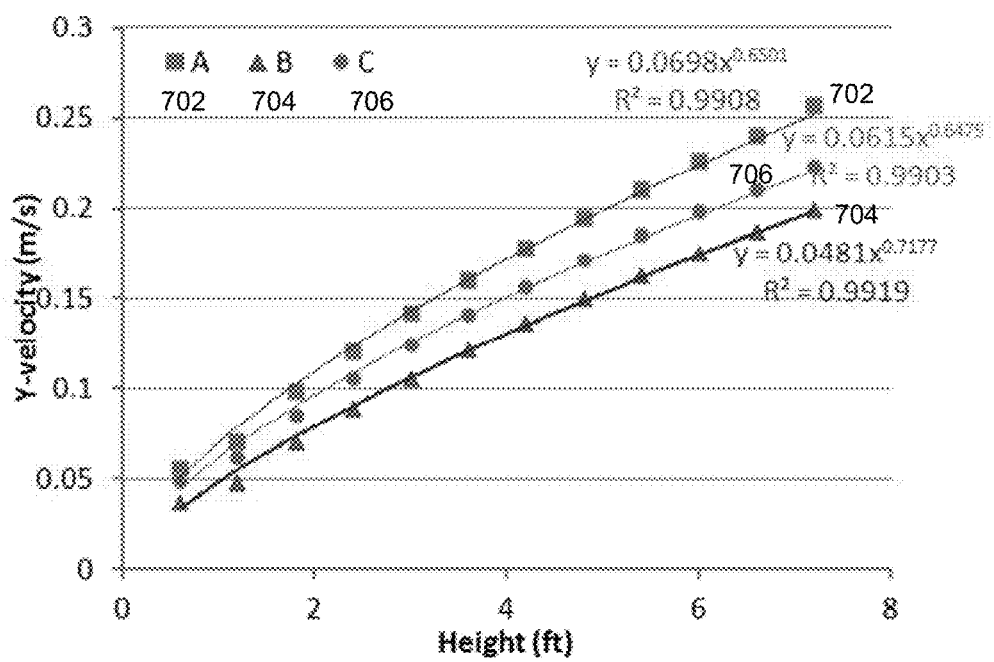
FIG. 7A is a graph illustrating vertical airflow specification using halo cells in accordance with one embodiment.
Figure 7B:
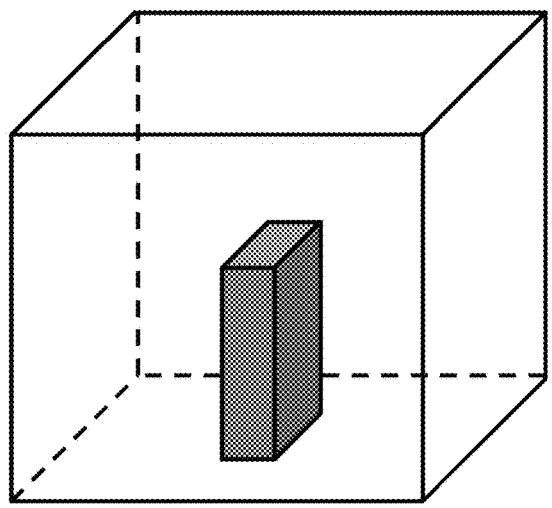
FIG. 7B is a schematic of a 3D representation of the heated block.
Figure 7C:
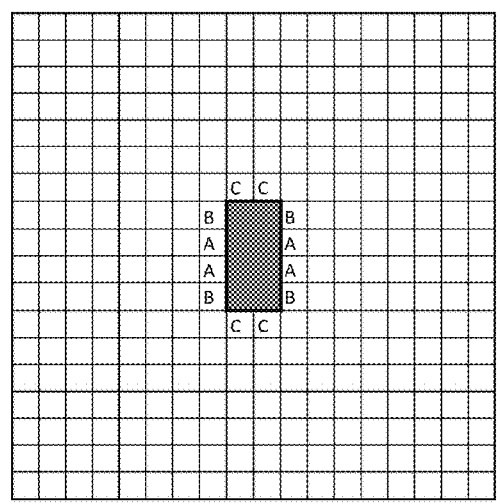
FIG. 7C is a schematic of a 2D representation of the heated block including faces A, B and C.

As illustrated in FIG. 7A, in one example, the halo cell velocity profile includes multiples representations 702, 704 and 706, corresponding to different locations around the faces of the heated block (also labeled A, B, C). A 3D representation of the heated block is show in FIG. 7B and a 2D representation of the heated block, including faces A, B and C is shown in FIG. 7C. In addition, the halo cell velocity profile may also depend on grid cell size. For example, if the PFM method uses 6 halo cells, then the corresponding CFD model from which halo velocities are derived should also utilize 6 cells. Moreover, the velocities at the top of the heated block may be relatively uniform and therefore can be estimated using the same formula. Note that the computed velocity may be specified in all or only the halo cells where the buoyancy dominates.

Buoyancy Correction

The buoyancy correction, determined in step 310, is further described below. As described above, the buoyancy correction can account for the velocities associated with warm air rising and cool air sinking. In summary, the buoyancy correction method calculates the airflow and temperature fields using the PFM method, then adds a buoyant velocity, $v_b$, to every grid cell in the vertical direction. In contrast to the jet airflow correction and the halo cell correction method described above, in the buoyancy correction method described below, the entire flow field is adjusted not just that near heated/cooled objects and airflow supplies. Also, unlike the other two correction techniques, the buoyancy correction is added to rather than replaces velocities predicted by the PFM.

The velocity associated with the buoyancy correction, in one example, can be expressed as:

$$v_b = \alpha \text{Sign}(\Delta T)\sqrt{g\beta H|\Delta T|} \quad (6)$$

where g is the acceleration due to gravity,
β is the coefficient of volumetric thermal expansion,
H is a characteristic vertical length scale,
ΔT is a characteristic temperature difference between the point of interest (grid cell) and another reference value, and
α is an empirically-determined coefficient.

The "Sign" function returns 1 if the number is positive, 0 if the number is 0 and 1 if the number is negative. It is used to ensure that local temperatures above and below the reference temperature create upward or downward buoyancy velocities respectively.

In at least one example, β may be equal to the reciprocal of absolute temperature for an ideal gas and α coefficient may be used to "tune" the E-PFM to best match CFD predictions.

In some examples, the $\sqrt{g\beta H|\Delta T|}$ portion of $v_b$ arises from a simple scale analysis in which the vertical momentum and buoyancy forces are assumed to balance one another. Consequently, the empirical coefficient α, in one example, can be of order 1. Note that as "characteristic" values, H and ΔT can be chosen somewhat arbitrarily to optimize model accuracy. For example, H can be interpreted as the height of the room or it might vary based on the height of nearby solid objects or it could be taken as the height of each individual grid cell. Similarly, the ΔT may be chosen as a fixed reference temperature or with reference to neighboring grid cells. In one example, the fixed reference temperature may be the temperature of the coldest air supplied to the room.

Because the temperature is computed at cell centers and velocities at cell faces, the velocity at any horizontal cell face is based on the average $v_b$ computed for the cells just below and just above the cell face. The flow field resulting from the velocity $v_b$ being applied to each grid cell is almost always no longer mass conserving and, therefore, no longer energy-conserving, resulting in energy imbalances. Thus, the "projection" step described below can be used to convert the buoyancy-corrected flow field, determined in step 310, back to a proper mass-conserving field.

Projection Step Correction

As discussed above, the projection step is a procedure for converting the flow field determined above in step 312 into a mass conserving flow field. The projection step was originally developed as a time-splitting technique and has been subsequently used in Fast Fluid Dynamics (FFD) simulations. In both cases, the step is used to enforce mass conservation following other solution steps which, while necessary to model various physical phenomena, have created mass imbalances. These original uses of the projection (correction) step are for purely transient (time-varying) applications. The E-PFM analyses in examples described herein are generally steady-state simulations and the final projection step is, therefore, independent of time.

A detailed derivation of the steady-state version of the projection step is not shown here but it starts with a transient analysis in which we compute a pressure field that must exist if we were to "push" the flow back into mass-conservation solely through the action of pressure forces over a small time step. In the end, no reference to time is required if we "bury" the time step within a modified pressure $\tilde{p}$.

To apply the correction to the steady-state airflow pattern, we first compute a modified pressure based on the non-mass-conserving velocity field $\vec{V}^*$ created by the addition of the buoyancy correction to the flow field. The modified pressure, as with velocity potential in the original PFM analysis, may be computed by solving a Poisson's Equation:

$$\nabla^2 \tilde{p} = \nabla \cdot \vec{V}^* \quad (7)$$

To obtain the final corrected velocities from the projection step we subtract the gradient of the modified pressure field from the (non-mass-conserving) buoyancy-corrected flow field:

$$\vec{V} = \vec{V}^* - \nabla \tilde{p} \quad (8)$$

Figure 8:
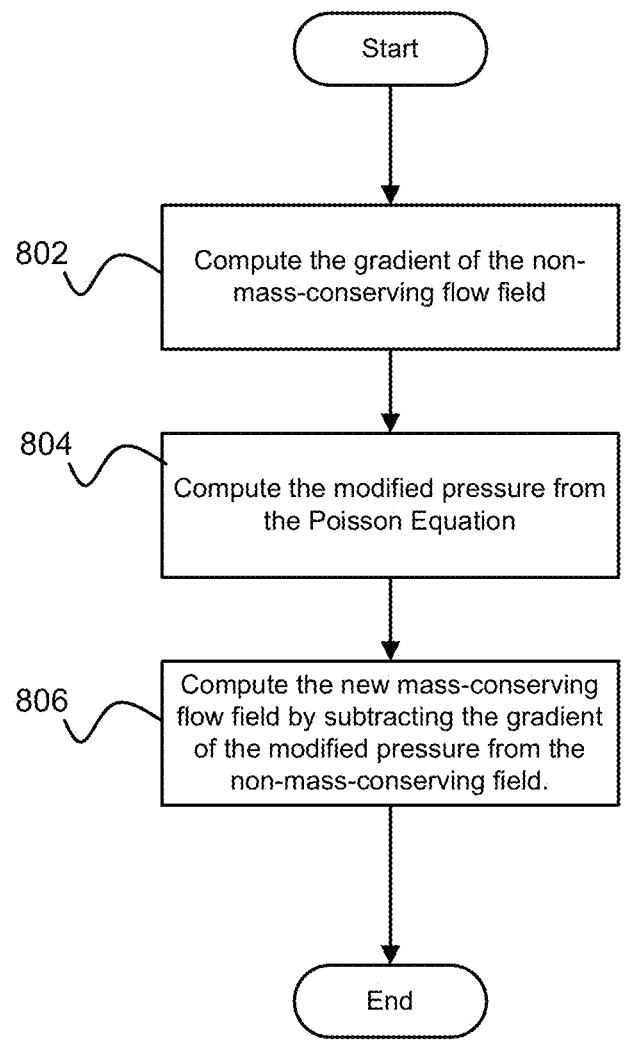
FIG. 8 is a flow diagram of one example process for the projection step method in accordance with one embodiment.

The projection step method to create a mass-conserving field from a non-mass-conserving field is summarized in FIG. 8. For simplicity, we present the discretized form of the equations with reference to the 2D structured computational grid of FIG. 2.

In step 802, the gradient of the modified pressure $(\nabla \cdot \vec{V}^*)_i$ can be computed from the non-mass-conserving flow field as:

$$(\nabla \cdot \vec{V}^*)_i = \frac{1}{\Delta x}(u_E^* - u_W^* + v_N^* - v_S^*) \quad (9)$$

In step 804, we compute the modified pressure by solving the Poisson Equation. With reference to the computational grid of FIG. 2, which includes the cells 202, 204, 206, and 208, the modified $\tilde{p}$ is computed at grid cell i, with $\tilde{p}_N$ representing the modified pressure in cell 202, $\tilde{p}_S$ representing the pressure in cell 206, $\tilde{p}_E$ representing pressure in cell 204 and $\tilde{p}_W$ representing the pressure in 208. The modified $\tilde{p}$ can be expressed as:

$$\tilde{p}_i = \frac{1}{4}\left(\tilde{p}_N + \tilde{p}_S + \tilde{p}_E + \tilde{p}_W - \Delta x^2 (\nabla \cdot \vec{V}^*)_i\right) \quad (10)$$

Finally, in step 806, we compute the mass-conserving flow field by subtracting the gradient of the modified pressure field from the original non-conserving flow field.

In step 806, actual velocities can be determined as functions of the modified pressure in each cell:

$$u_E = u_E^* - \frac{1}{\Delta x}(\tilde{p}_E - \tilde{p}_i) \text{ and } u_w = u_w^* - \frac{1}{\Delta x}(\tilde{p}_i - \tilde{p}_w), \quad (11)$$

$$u_V = v_N^* - \frac{1}{\Delta x}(\tilde{p}_N - \tilde{p}_i) \text{ and } v_S = v_S^* - \frac{1}{\Delta x}(\tilde{p}_i - \tilde{p}_S). \quad (12)$$

Figure 9:
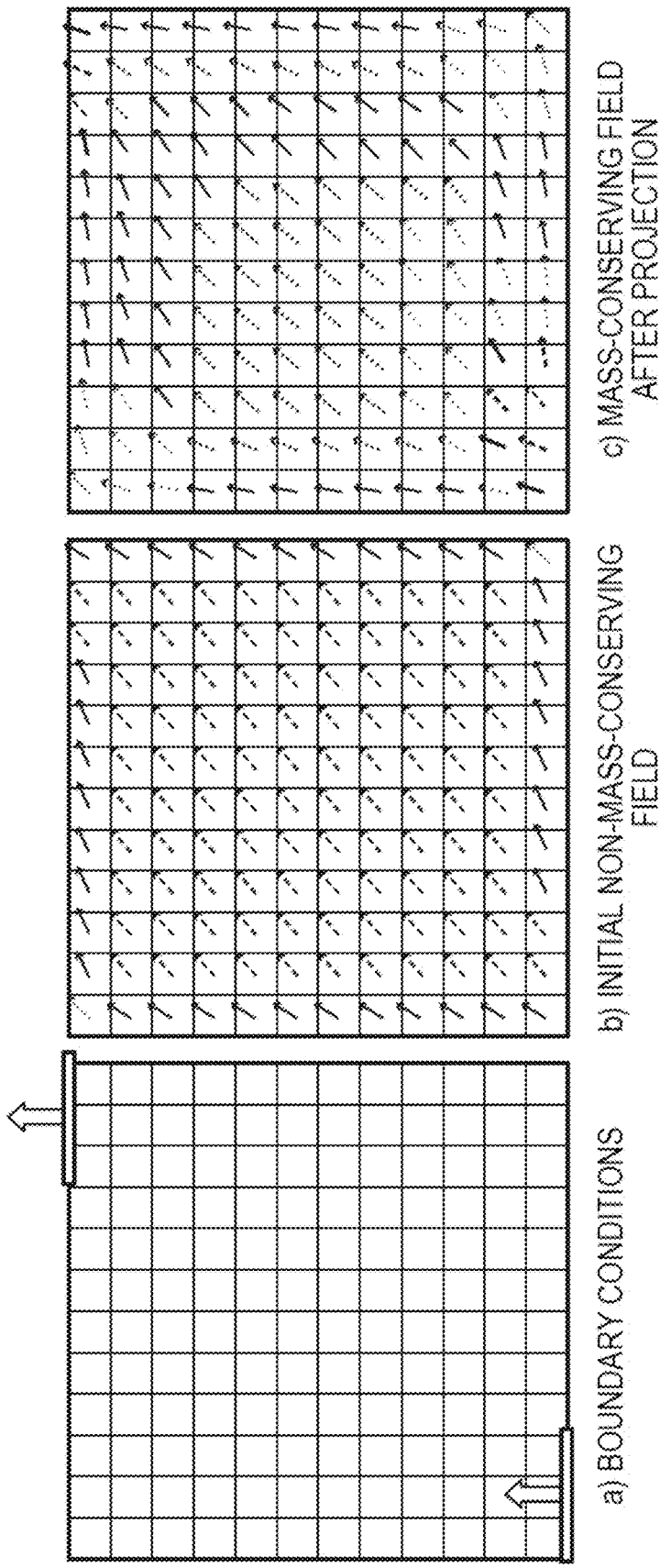
FIG. 9A is a schematic of an area having boundary conditions.
FIG. 9B is a schematic of the area including initial non-mass-conserving airflow field.
FIG. 9C is a schematic of the area including a mass-conserving airflow field.

FIGS. 9A-9C show one example of a projection step including initial non mass conserving field and the mass conserving field after the projection step is performed. FIG. 9A shows boundary conditions represented in a 2D representation of a room 900. As illustrated, airflow enters the bottom left and exits the top right of the room 900. The initial field is set to a generally northeast flow as shown in FIG. 9B from the bottom left inlet to the top right exhaust. In FIG. 9B, the flow is only purely in northeast direction in the interior as the flow and wall boundaries influence the initial field around the perimeter of the domain. FIG. 9C shows the flow field modified after the projection step. In FIG. 9C, the primary features of the airflow field are retained, the flow is still generally in the northeast direction from the inlet to the exhaust. In addition, the airflow now also includes smooth transitions that have replaced abrupt changes in flow direction. The airflow field shown in FIG. 9C is consistent with mass conservation.

A General Room Example

Figure 10:
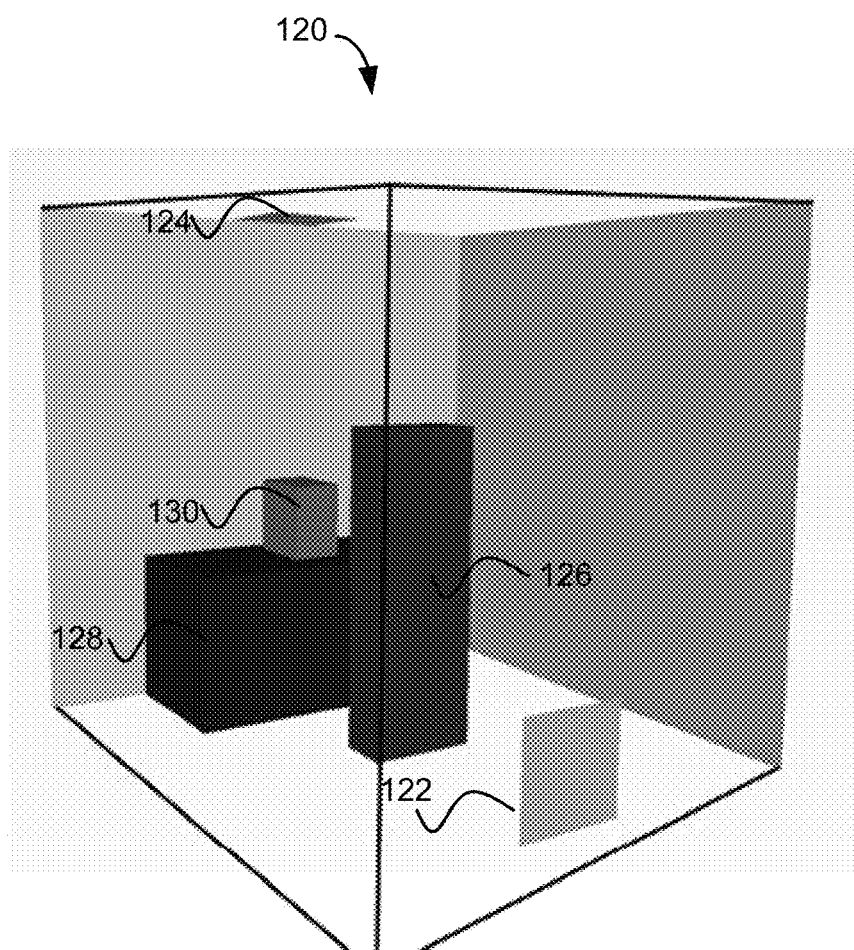
FIG. 10 is a schematic of one layout of a 3D room in which airflow is modeled in accordance with one embodiment.
Figure 11:
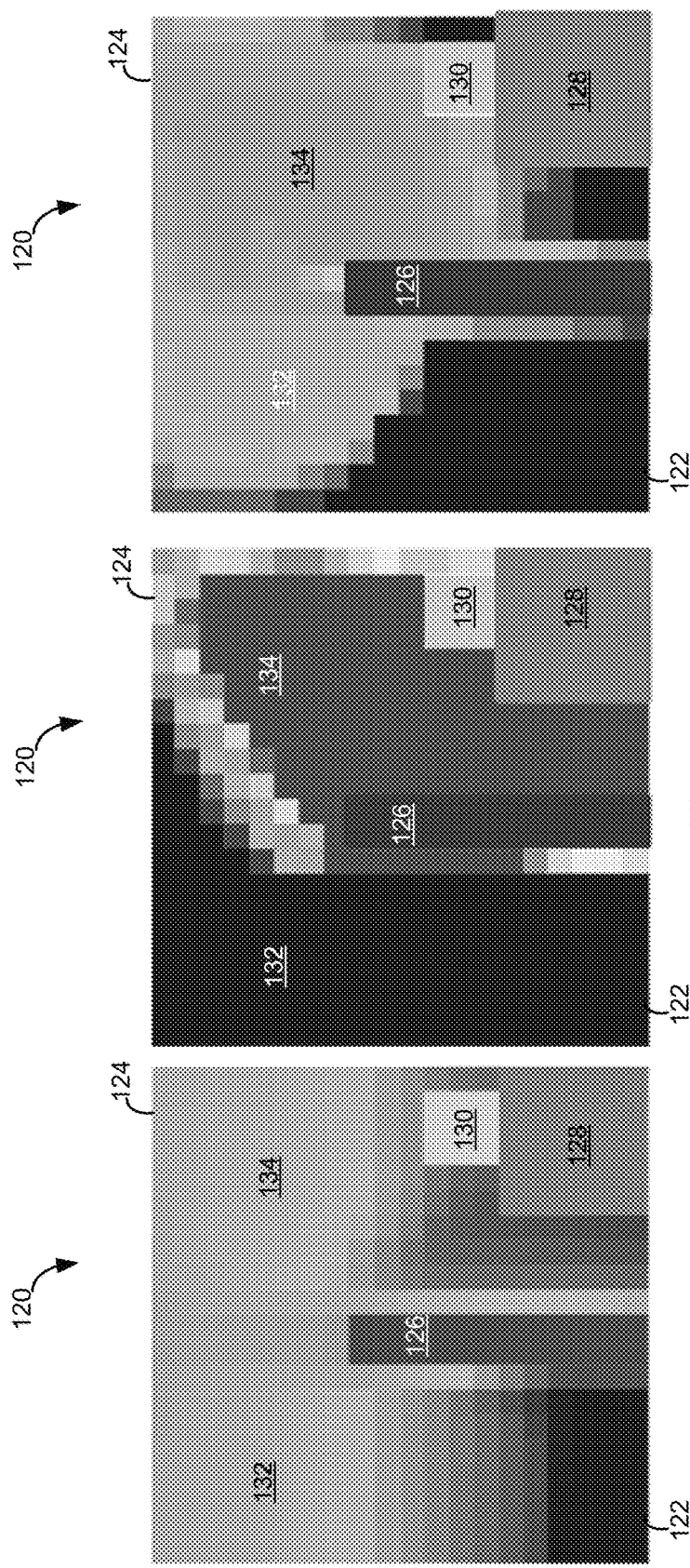
FIG. 11A is a schematic of temperature values determined using the CFD method.
FIG. 11B is a schematic of temperature values determined using the PFM method.
FIG. 11C is a schematic of temperature values determined using the E-PFM method in accordance with one embodiment.
Figure 12:
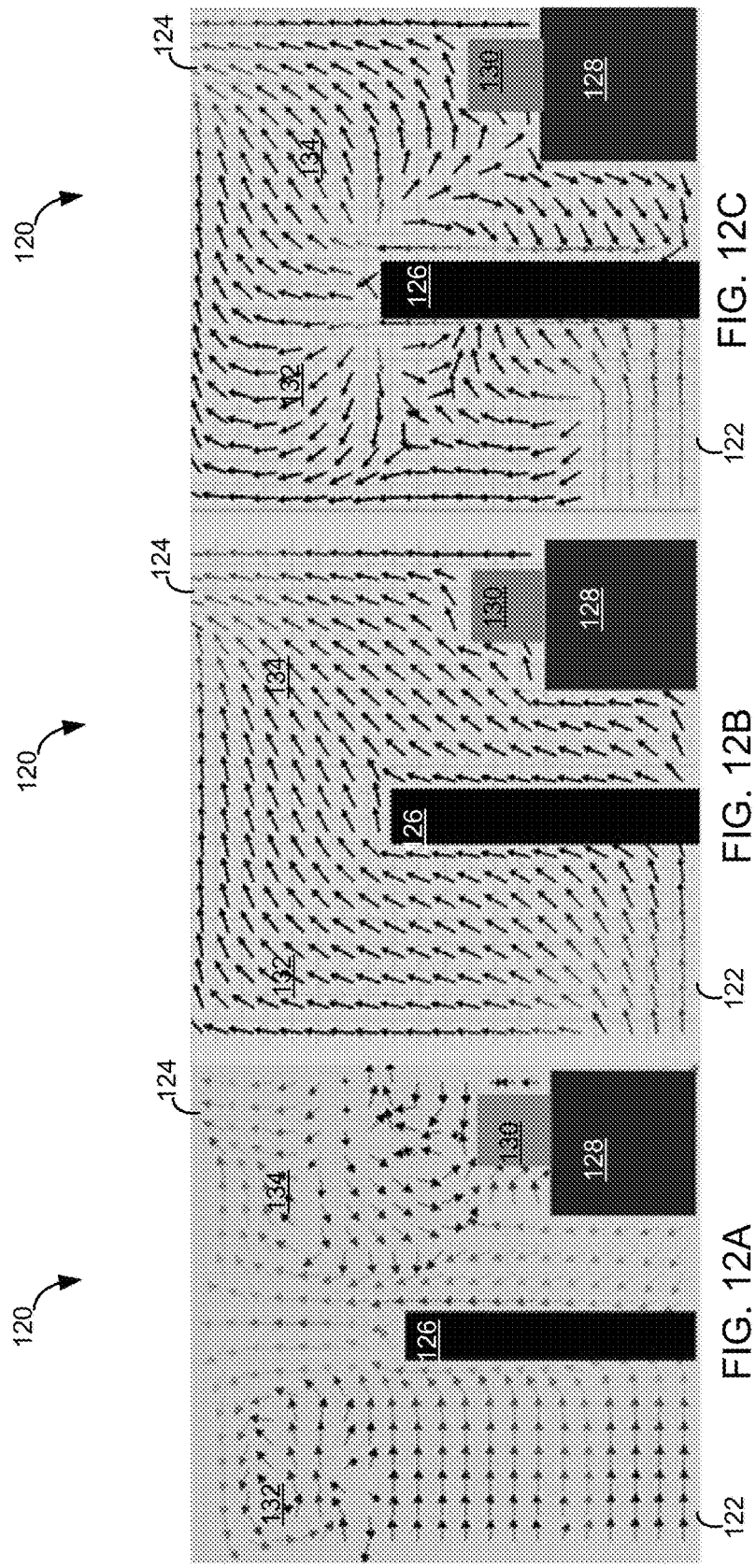
FIG. 12A is a schematic of airflow values determined using the CFD method.
FIG. 12B is a schematic of airflow values determined using the PFM method.
FIG. 12C is a schematic of airflow values determined using the E-PFM method in accordance with one embodiment.

The results of the E-PFM method 300 can be illustrated with reference to FIGS. 10, 11 and 12. FIGS. 10, 11 and 12 compare three approaches the CFD, the PFM and the E-PFM method described herein, featuring the jet model, the specified velocities at halo cells, and the buoyancy correction. The methods are implemented as they would be in a general building ventilation design application. The CFD, the PFM and the E-PFM methods in the following examples are performed under similar simulation setups and inputs and include a simple coarse-grid model of a room. FIG. 10 illustrates one example of a room 120 in an office space environment, having dimensions 10 ft by 10 ft by 10 ft. The office space 120 includes a vent opening 122 at the bottom of one wall inputting airflow into a room and a ceiling return 124 through which air exits the room. The room 120 includes one heat-generating block 126, for example, a human-shaped object adding 50 W to the room. The room 120 further includes a desk 128, and a computer 130.

FIGS. 11A-11C illustrate a 2D representation of the temperature fields through the middle of the room 120, for example at 5 ft. The temperature fields generated by CFD are shown in FIG. 11A, the PFM temperature fields are shown in FIG. 11B, and the E-PFM produced temperature fields are shown in FIG. 11C. The resultant temperatures determined using PFM shown in FIG. 11B are strongly over-predicted in areas to the right of the heat-generating block 134 and there is also no observed temperature progression from low to high from the bottom to the top of the room. The correction methods of the E-PFM shown in FIG. 11 address these temperature over-predicted temperatures and produce a realistic-looking temperature map.

In addition to comparing the temperature fields, the maximum temperature of the room for each approach can also be compared. The maximum temperature can assist in evaluating each of our PFM-based methods' ability to capture the right level of mixing present compared to CFD. The maximum temperature calculated using the PFM-based method for the room 120 is 44° C., while the maximum temperature for CFD is 21° C., and the maximum temperature for the E-PFM based method is 22° C. The maximum temperature for the E-EFM is similar to CFD, showing that the E-PFM method provides is a dramatic improvement over PFM.

FIGS. 12A-C illustrate a 2D representation of the velocity fields through the middle of the room 120, generated by CFD, shown in FIG. 12A, PFM shown in FIG. 12B, and E-PFM shown in FIG. 12C. The velocity fields in the room provide an explanation for the gains in accuracy of E-PFM. FIGS. 12A-C show the velocities and directions in the same plane or profile as FIGS. 11A-C. The velocities produced using E-PFM shown in FIG. 12C include two recirculation areas 132 and 134 present in CFD. The recirculation area 132 is located to the left of the heated block, and the recirculation area 134 is located to the right of the heated block. The velocities produced using PFM shown in FIG. 12B do not include the recirculation areas. The recirculation areas 132 and 134 mix the airflow, create some stratification, and prevent the stagnation that causes the extremely high temperatures seen with PFM in FIG. 11B.

Data Center Applications and Examples

The results of the E-PFM method 300 can be illustrated with reference to FIGS. 13-15, which compare the PFM and the E-PFM described herein, in data center temperature and airflow estimation. As noted above, the halo cell and jet models may not be relevant in data center application. Therefore, in the examples that follow the E-PFM method is implemented with only buoyancy correction. However, in these examples, even with only the buoyancy correction, considerable accuracy gains are attained.

Figure 13:
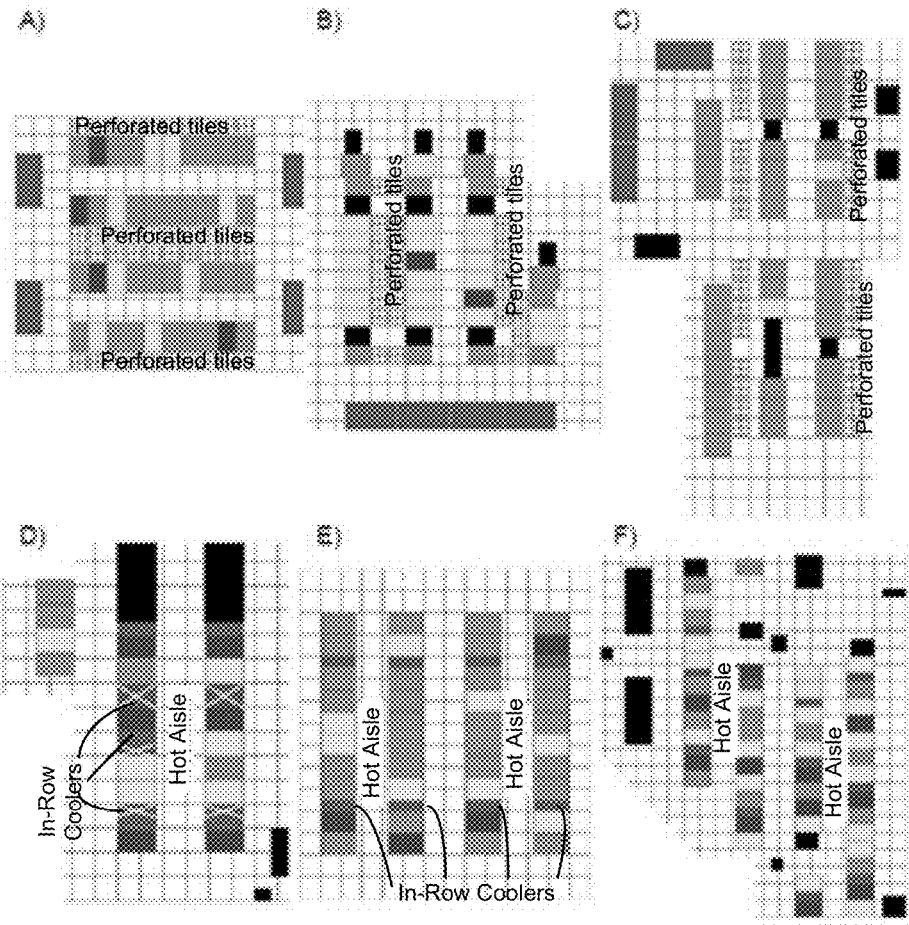
FIG. 13 is a schematic of six layouts of a data center in which temperature and airflow is modeled in accordance with one embodiment.

FIG. 13 illustrates six layouts A-F, according to some examples, featured in the analysis described below. The layouts A-F in the examples described herein provide a comprehensive representation of E-PFM's performance. The layouts are described in the PFM and CFD comparison study *Potential-Flow Modeling for Data Center Applications*, by Healey, C., VanGilder, J., Sheffer, Z., and Zhang, X., 2011, Proceedings of InterPACK, July 6-8, Portland, Oreg. The layouts A-F provide quantified improvements of E-PFM with respect to the prediction of average rack inlet temperatures and maximum rack inlet temperatures in raised-floor and locally cooled data center rooms. The layouts represent various configurations of racks represented various aisle configurations. For example, layout A includes multiple two aisle clusters with no in-row coolers, four CRAC coolers and perforated tiles, while layout E includes a multiple two aisle clusters, each separated by a hot aisle, which feature no perforated floor tiles and only in-row coolers.

To simplify the comparison between E-PFM, PFM, and CFD, an accuracy metric is utilized as discussed in *Potential-Flow Modeling for Data Center Applications*, by Healey, C., VanGilder, J., Sheffer, Z., and Zhang, X., 2011, Proceedings of InterPACK, July 6-8, Portland, Oreg. Given an E-PFM estimated temperature of rack j, $T_j^{E-PFM}$, accuracy with respect to the CFD estimate $T_j^{CFD}$ is defined as:

$$\text{Accuracy}(T_j^{E-PFM}) = 1 - \frac{|T_j^{E-PFM} - T_j^{CFD}|}{\Delta T_{ref}} \quad (13)$$

where $\Delta T_{ref}$ is a reference temperature difference (in this case set to 10° C.). The accuracy of PFM relative to CFD can be defined similarly.

Figures 14A, 14B:
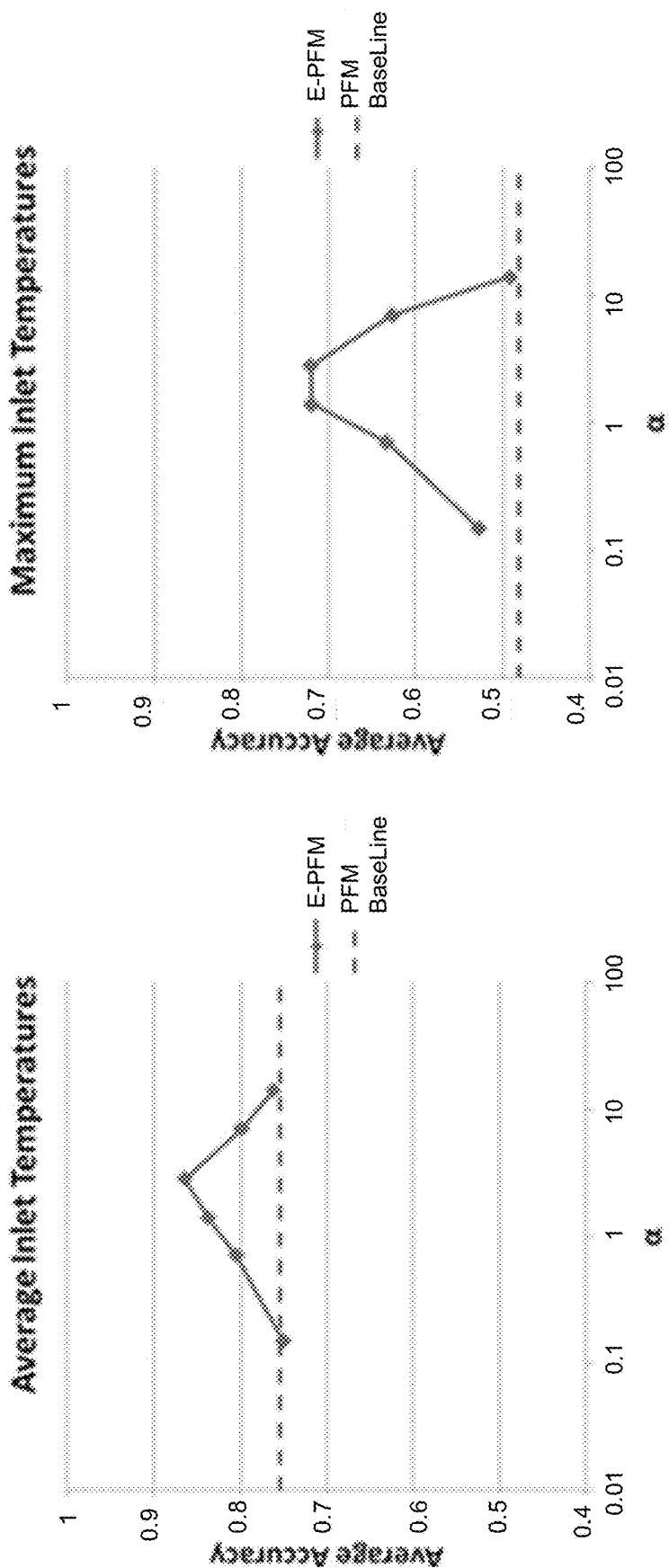
FIG. 14A is a graph comparing average accuracy of average inlet temperatures computed using the E-PFM and PFM methods.
FIG. 14B is a graph comparing average accuracy of maximum inlet temperatures computed using the E-PFM and PFM methods.

FIGS. 14A and 14B show a comparison of E-PFM to CFD in Layout C, including the average accuracy for E-PFM and PFM while varying $\alpha$, the empirically-determined coefficient of Equation (6). As described above, the velocity associated with the buoyancy correction, in one example, can be expressed as a function of acceleration due to gravity, coefficient of volumetric thermal expansion, characteristic vertical length scale, characteristic temperature difference between the point of interest (grid cell) and another reference value and an empirically-determined coefficient. The coefficient $\alpha$ in this example is varied between the multiple values such as {0.15, 0.7, 1.4, 2.8, 7.0, 14}. The characteristic vertical length scale, H of Equation (6) is taken to be the height of each cell, in this example 0.15 meters.

FIG. 14A plots the accuracy of E-PFM and PFM averaged over the average inlet temperature estimates within Layout C and FIG. 14B plots the accuracy of E-PFM and PFM averaged over the maximum inlet temperature estimates within Layout C. The FIGS. 14A and 14B shows that the E-PFM method can dramatically reduce error with appropriate selection of α. improving accuracy and at best halving the remaining error (as an accuracy of 1 occurs with a perfect set of estimates). The plots show a substantial improvement in average and maximum inlet temperature predictions, especially the latter, an area where PFM particularly struggles for accuracy. It is appreciated that there are accuracy gains in all values of α between 0.15 and 14, but the results, including other experiments performed with the other layouts A, B, D, E and F, suggest that the most effective values of α can fall between 1 and 5.

Figure 15:
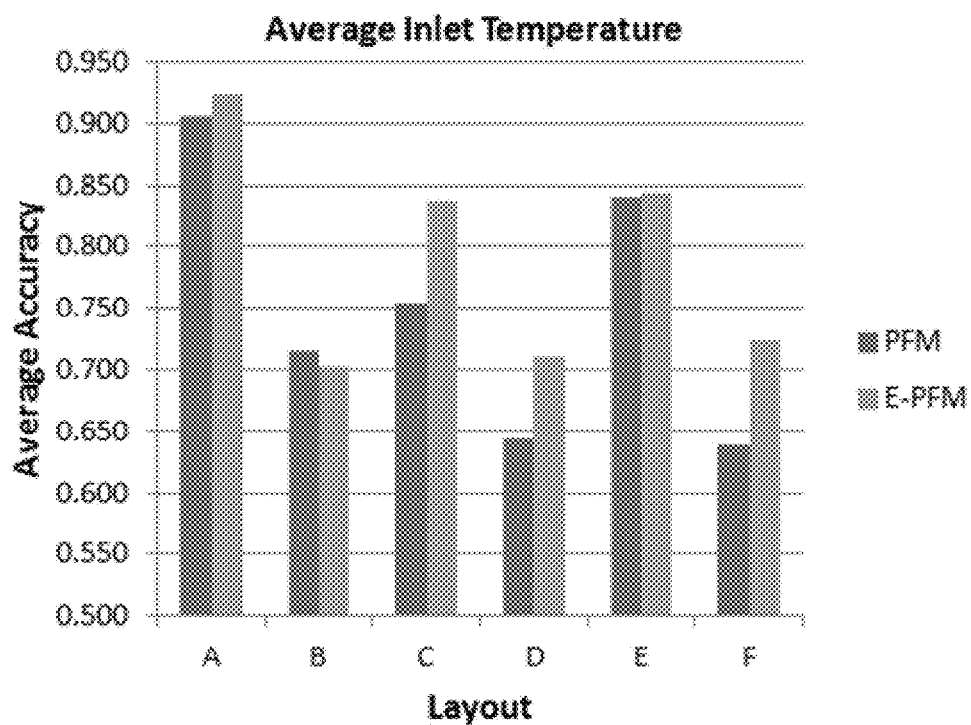
FIG. 15 is a graph comparing average accuracy for each of the six layouts computed using the E-PFM and PFM methods.

FIG. 15 shows a comparison of E-PFM and PFM accuracy for average inlet temperatures over all six A-F layouts. FIG. 15 is determined with E-PFM with α=1.4 and H=0.15. In four of the six layouts, a substantial improvement (over 33% reduction of error) is observed compared to PFM. While a small deterioration of accuracy with E-PFM in Layout B for average inlet temperatures is observed, it is appreciated that α=1.4 still improves the accuracy of maximum temperature predictions in that layout. In all of the tests performed, the Layout E was found to be relatively independent of E-PFM's implementation, neither improving nor declining in accuracy with varying values of the coefficient α.

These results suggest that using E-PFM with a well-chosen a will dramatically improve the accuracy of data center temperature predictions, in general, average and maximum rack inlet temperatures. In more than half of the data center cases tested, use of the buoyancy correction significantly reduced error.

Computer System

Various aspects and functions described herein in accordance with the present embodiments may be implemented as hardware or software on one or more computer systems. There are many examples of computer systems currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects in accordance with the present embodiments may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the embodiments are not limited to executing on any particular system or group of systems. Further, aspects may be implemented in software, hardware or firmware, or any combination thereof. Thus, aspects in accordance with the present embodiments may be implemented within methods, acts, systems, system elements and components using a variety of hardware and software configurations, and the embodiments are not limited to any particular distributed architecture, network, or communication protocol.

Figure 16:
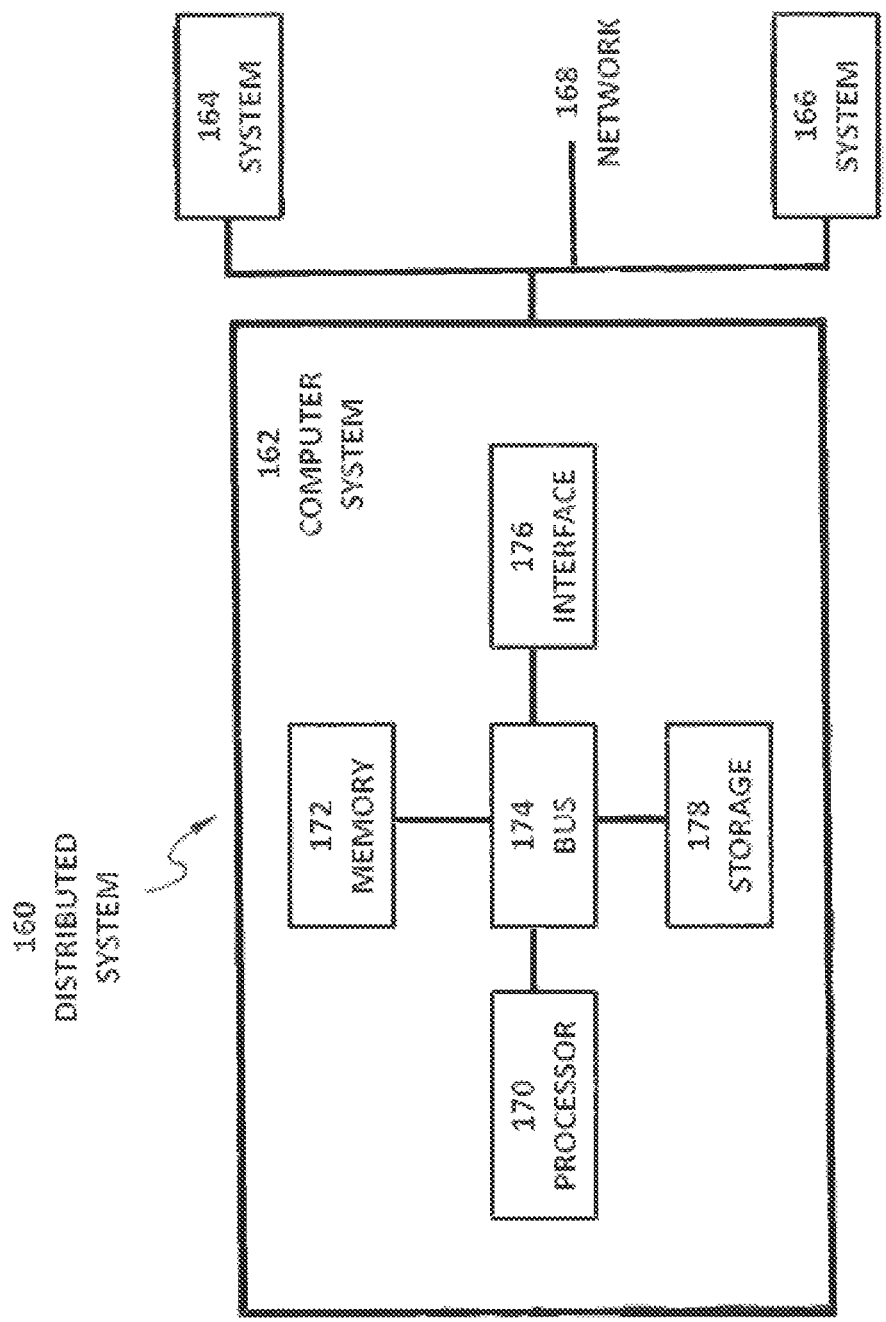
FIG. 16 is a block diagram of one example of a computer system with which various aspects in accord with the present invention may be implemented.

FIG. 16 shows a block diagram of a distributed computer system 160, in which various aspects and functions in accord with the present embodiments may be practiced. Distributed computer system 160 may include one more computer systems. For example, as illustrated, distributed computer system 160 includes computer systems 162, 164 and 166. As shown, computer systems 162, 164 and 166 are interconnected by, and may exchange data through, communication network 168. Network 168 may include any communication network through which computer systems may exchange data. To exchange data using network 168, computer systems 162, 164 and 166 and network 168 may use various methods, protocols and standards, including, among others, token ring, Ethernet, wireless Ethernet, Bluetooth, TCP/IP, UDP, Http, FTP, SNMP, SMS, MMS, SS7, Json, Soap, and Corba. To ensure data transfer is secure, computer systems 162, 164 and 166 may transmit data via network 168 using a variety of security measures including TLS, SSL or VPN among other security techniques. While distributed computer system 160 illustrates three networked computer systems, distributed computer system 160 may include any number of computer systems and computing devices, networked using any medium and communication protocol.

Various aspects and functions in accordance with the present embodiments may be implemented as specialized hardware or software executing in one or more computer systems including computer system 162 shown in FIG. 16. As depicted, computer system 162 includes processor 170, memory 172, bus 174, interface 176 and storage 178. Processor 170 may perform a series of instructions that result in manipulated data. Processor 170 may be a commercially available processor such as an Intel Pentium, Motorola PowerPC, SGI MIPS, Sun UltraSPARC, or Hewlett-Packard PA-RISC processor, but may be any type of processor, multi-processor, microprocessor or controller as many other processors and controllers are available. Processor 170 is connected to other system elements, including one or more memory devices 172, by bus 174.

Memory 172 may be used for storing programs and data during operation of computer system 162. Thus, memory 172 may be a relatively high performance, volatile, random access memory such as a dynamic random access memory (DRAM) or static memory (SRAM). However, memory 172 may include any device for storing data, such as a disk drive or other non-volatile, non-transitory, storage device. Various embodiments in accordance with the present invention may organize memory 172 into particularized and, in some cases, unique structures to perform the aspects and functions disclosed herein.

Components of computer system 162 may be coupled by an interconnection element such as bus 174. Bus 174 may include one or more physical busses, for example, busses between components that are integrated within a same machine, but may include any communication coupling between system elements including specialized or standard computing bus technologies such as IDE, SCSI, PCI and InfiniBand. Thus, bus 174 enables communications, for example, data and instructions, to be exchanged between system components of computer system 162.

Computer system 162 also includes one or more interface devices 176 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow computer system 162 to exchange information and communicate with external entities, such as users and other systems.

Storage system 178 may include a computer readable and writeable, nonvolatile, non-transitory, storage medium in which instructions are stored that define a program to be executed by the processor. Storage system 178 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor or some other controller may cause data to be read from the nonvolatile recording medium into another memory, such as memory 172, that allows for faster access to the information by the processor than does the storage medium included in storage system 178. The memory may be located in storage system 178 or in memory 172, however, processor 170 may manipulate the data within the memory 172, and then may copy the data to the medium associated with storage system 178 after processing is completed. A variety of components may manage data movement between the medium and integrated circuit memory element and the presently described embodiments are not limited thereto. Further, the embodiments are not limited to a particular memory system or data storage system.

Although computer system 162 is shown by way of example as one type of computer system upon which various aspects and functions in accordance with the present embodiments may be practiced, any aspects of the presently disclosed embodiments are not limited to being implemented on the computer system as shown in FIG. 16. Various aspects and functions in accord with the presently disclosed embodiments may be practiced on one or more computers having a different architectures or components than that shown in FIG. 16. For instance, computer system 162 may include specially-programmed, special-purpose hardware, such as for example, an application-specific integrated circuit (ASIC) tailored to perform a particular operation disclosed herein. While another embodiment may perform the same function using several general-purpose computing devices running MAC OS X with 32-bit Intel and 64-bit Intel processors and several specialized computing devices running proprietary hardware and operating systems.

Computer system 162 may be a computer system including an operating system that manages at least a portion of the hardware elements included in computer system 162. Usually, a processor or controller, such as processor 170, executes an operating system which may be, for example, a Windows-based operating system, such as, Windows NT, Windows 2000 (Windows ME), Windows XP, Windows Vista, Windows 7, and Windows 8 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The processor and operating system together define a computer platform for which application programs in high-level programming languages may be written. These component applications may be executable, intermediate, for example, C-, bytecode or interpreted code which communicates over a communication network, for example, the Internet, using a communication protocol, for example, TCP/IP. Similarly, aspects in accord with the presently disclosed embodiments may be implemented using an object-oriented programming language, such as .Net, Small-Talk, Java, C++, Ada, or C# (C-Sharp). Other object-oriented programming languages may also be used. Alternatively, functional, scripting, or logical programming languages may be used.

Additionally, various aspects and functions in accordance with the presently disclosed embodiments may be implemented in a non-programmed environment, for example, documents created in HTML, XML or other format that, when viewed in a window of a browser program, render aspects of a graphical-user interface or perform other functions. Further, various embodiments in accord with the present invention may be implemented as programmed or non-programmed elements, or any combination thereof. For example, a web page may be implemented using HTML while a data object called from within the web page may be written in C++. Thus, the presently disclosed embodiments are not limited to a specific programming language and any suitable programming language could also be used.

A computer system included within an embodiment may perform additional functions outside the scope of the presently disclosed embodiments. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB, a subsidiary of Oracle or integration software such as Web Sphere middleware from IBM of Armonk, N.Y. However, a computer system running, for example, SQL Server may be able to support both aspects in accord with the presently disclosed embodiments and databases for sundry applications.

Embodiments described herein provide novel methods and systems for determining airflow through areas in a building and equipment in a data center. The ability to predict airflow accurately in a design or management tool in embodiments of the invention facilitates designing robust infrastructure such as data centers and HVAC systems that exhibit good cooling and ventilation performance under different layout configurations. Further, embodiments facilitate avoiding costly trial-and-error solutions in a facility in attempts to achieve particular performance results. Still further, better accuracy in airflow predictions results in improved overall data center cooling analysis and building ventilation system and can provide a more energy efficient solutions. In at least some embodiments described herein, airflow is described as being generated by inlets, outlets, fans and leakages. Systems and methods described herein can be used with other types of sources of air, including other types of cooling, ventilation devices and fans. In at least some embodiments, methods are described as determining specific airflows. In at least some embodiments, the determination is a prediction or estimation of actual airflows.

In at least some embodiments of the invention discussed herein, the performance of assessments and calculations are occasionally referred to as "real-time". As referred to herein, "real-time" refers to processes that are completed in a matter of a few seconds or less rather than several minutes or longer. Such durations can happen with complex calculations, such as those involving typical CFD calculations.

In at least some embodiments described above, the design of a facility (such as a data center or a building) and/or actual parameters are altered based on predicted airflow in the facility. The alterations may be implemented to improve the cooling performance and/or may be implemented to provide cost and/or power savings when the performance is found to be within predetermined specifications. For example, the location of equipment racks may be changed and/or the types of racks or rack configurations may be changed. Further, based on determined airflow values, a data management system in accordance with one embodiment may control one or more CRACs or in-row cooling devices to adjust the airflow, and in addition, one or more equipment racks can be controlled to reduce power if the airflow from cooling providers is not adequate to provide sufficient cooling.

In at least some embodiments described above, tools and processes are provided for determining rack airflow in a data center and airflow in a building. In other embodiments, the tools and processes may be used in other types of facilities, and may also be used in mobile applications, including mobile data centers. Further, processes and systems in accordance with embodiments described herein may be used in a wide variety of equipment racks having various inlets, outlets and internal structures. The terms inlet and outlet, as used herein, may include a single open area of a rack such as a vent, a group of vents closely spaced together to effectively act as one opening, or a single opening having many individual open areas.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for controlling airflow, the method comprising:
receiving input data related to a physical layout of a facility;
dividing, by a computer, a representation of the facility into a plurality of grid cells;
identifying where airflow pattern effects of jet airflow, thermally-driven buoyant plumes surrounding at least one heat producing object, and buoyancy forces are present in the facility based on the input data related to the physical layout;
responsive to identifying airflow pattern effects of jet airflow, calculating a jet airflow velocity value for at least one grid cell within a first set of the plurality of grid cells that is influenced by the jet airflow based on a jet correction model;
responsive to identifying airflow pattern effects of thermally-driven buoyant plumes surrounding at least one heat producing object, calculating an airflow velocity value for at least one grid cell within the first set of the plurality of grid cells that is disposed adjacent to the at least one heat producing object based on a correction model, the correction model including determining a vertical airflow velocity component associated with ambient air heated by the at least one heat producing object to generate the thermally-driven buoyant plumes;
calculating, by the computer, an airflow velocity value for each of a second set of the plurality of grid cells using a potential flow model, the second set being different from the first set;
responsive to identifying airflow pattern effects of buoyancy forces, calculating a buoyant airflow velocity value for at least one grid cell within the second set of the plurality of grid cells where the effects of the buoyancy forces are present, the calculated buoyant airflow velocity value based at least in part on a coefficient of volumetric thermal expansion and a temperature of a coldest air supplied to the facility;
modifying the calculated airflow velocity value of the at least one grid cell within the second set of the plurality of grid cells with the calculated buoyant airflow velocity values to correct for the airflow pattern effects from the buoyancy forces;
storing, on a storage device, the calculated jet airflow velocity values, the calculated airflow velocity values of the first set of grid cells, each calculated airflow velocity value not subsequently modified, and the at least one modified airflow velocity value; and
controlling at least one of airflow associated with one or more cooling providers and power associated with one or more equipment racks in the facility based on at least one of the calculated jet airflow velocity values, the calculated airflow velocity values of the first set of grid cells, each calculated airflow velocity value not subsequently modified, and the at least one modified airflow velocity value.

2. The method according to claim 1, wherein the method further comprises configuring equipment in the facility based on at least one of the calculated jet airflow velocity values, the calculated airflow velocity values of the first set of grid cells, each calculated airflow velocity value not subsequently modified, and the at least one modified airflow velocity value.

3. The method according to claim 1, further comprising calculating, by the computer, a temperature value, based on at least one calculated airflow velocity value, for each of the second set of the plurality of grid cells.

4. The method according to claim 1, wherein the facility includes a space in a data center and objects in the physical layout include at least one equipment rack, including the one or more equipment racks and at least one cooling provider, including the one or more cooling providers.

5. The method according to claim 1, wherein the facility includes a space in a building and objects in the physical layout include at least one ventilation structure and at least one heat provider.

6. The method according to claim 1, wherein modifying the calculated airflow velocity value of the at least one grid cell includes adding the calculated buoyant airflow velocity value to the calculated airflow velocity value for the at least one grid cell.

7. The method according to claim 1, further comprising determining new airflow velocity values for each of the at least one modified velocity value and each calculated airflow velocity value not subsequently modified, using an iterative method, wherein the new airflow velocity values satisfy a mass balance equation.

8. The method according to claim 7, further comprising:
determining whether differences between the new airflow velocity values and previous airflow velocity values are greater than a threshold; and
repeating the iterative method until the differences are not greater than the threshold.

9. A system for controlling airflow, the system including a memory and a processor coupled to the memory and being configured to:
receive input data related to a physical layout of a facility;
divide a representation of the facility into a plurality of grid cells;
identify where airflow pattern effects of jet airflow, thermally-driven buoyant plumes surrounding at least one heat producing object, and buoyancy forces are present in the facility based on the input data related to the physical layout;
calculate a jet airflow velocity value for at least one grid cell within a first set of the plurality of grid cells that is influenced by the jet airflow based on a jet correction model responsive to identifying airflow pattern effects of jet airflow;
calculate an airflow velocity value for at least one grid cell within the first set of the plurality of grid cells that is disposed adjacent to the at least one heat producing object based on a correction model, the correction model including a determination of a vertical velocity component associated with ambient air heated by the at least one heat producing object to generate the thermally-driven buoyant plumes responsive to identifying airflow pattern effects of thermally-driven buoyant plumes surrounding at least one heat producing object;
calculate by the computer, an airflow velocity value for each of a second set of the plurality of grid cells using a potential flow model, the second set being different from the first set;
calculate a buoyant airflow velocity value for at least one grid cell within the second set of the plurality of grid cells where the effects of the buoyancy forces are present responsive to identifying airflow pattern effects of buoyancy forces, the calculated buoyant airflow velocity value based at least in part on a coefficient of volumetric thermal expansion and a temperature of a coldest air supplied to the facility;
modify the calculated airflow velocity value of the at least one grid cell within the second set of the plurality of grid cells with the calculated buoyant airflow velocity values to correct for the airflow pattern effects from the buoyancy forces;
store on a storage device, the calculated jet airflow velocity values, the calculated airflow velocity values of the first set of grid cells, each calculated airflow velocity value not subsequently modified, and the at least one modified airflow velocity value; and
control at least one of airflow associated with one or more cooling providers and power associated with one or more equipment racks in the facility based on at least one of the calculated jet airflow velocity values, the calculated airflow velocity values of the first set of grid cells, each calculated airflow velocity value not subsequently modified, and the at least one modified airflow velocity value.

10. The system according to claim 9, wherein the system is further configured to configure equipment in the facility based on at least one of the calculated jet airflow velocity values, the calculated airflow velocity values of the first set of grid cells, each calculated airflow velocity value not subsequently modified, and the at least one modified airflow velocity value.

11. The system according to claim 9, wherein the system is further configured to calculate a temperature value, based on at least one calculated airflow velocity value, for each of the second set of the plurality of grid cells.

12. The system according to claim 9, wherein the facility includes a space in a data center and objects in the physical layout include at least one equipment rack, including the one or more equipment racks, and at least one cooling provider, including the one or more cooling providers.

13. The system according to claim 9, wherein the facility includes a space in a building and objects in the physical layout include at least one ventilation structure and at least one heat provider.

14. The system according to claim 9, wherein the system is further configured to modify the calculated airflow velocity value of the at least one grid cell within the second set of the plurality of grid cells by adding the calculated buoyant airflow velocity value to the calculated airflow velocity value for the at least one grid cell.

15. The system according to claim 9, wherein the system is further configured to calculate new airflow velocity values for each of the at least one modified velocity value and each calculated airflow value not subsequently modified, wherein the new airflow velocity values satisfy a mass balance equation.

16. A non-transitory computer readable medium having stored thereon sequences of instruction for controlling airflow including instructions that will cause at least one processor to:
receive input data related to a physical layout of a facility;
divide a representation of the facility into a plurality of grid cells;
identify where airflow pattern effects of jet airflow, thermally-driven buoyant plumes surrounding at least one heat producing object, and buoyancy forces are present in the facility based on the input data related to the physical layout;
calculate a jet airflow velocity value for at least one grid cell within a first set of the plurality of grid cells that is influenced by the jet airflow based on a jet correction model responsive to identifying airflow pattern effects of jet airflow;
calculate an airflow velocity value for at least one grid cell within the first set of the plurality of grid cells that is disposed adjacent to the at least one heat producing object based on a correction model, the correction model including a determination of a vertical airflow velocity component associated with ambient air heated by the at least one heat producing object to generate the thermally-driven buoyant plumes responsive to identifying airflow pattern effects of thermally-driven buoyant plumes surrounding at least one heat producing object;
calculate by the computer, an airflow velocity value for each of a second set of the plurality of grid cells using a potential flow model, the second set being different from the first set;
calculate a buoyant airflow velocity value for at least one grid cell within the second set of the plurality of grid cells where the effects of the buoyancy forces are present responsive to identifying airflow pattern effects of buoyancy forces, the calculated buoyant airflow velocity value based at least in part on a coefficient of volumetric thermal expansion and a temperature of a coldest air supplied to the facility;

modify the calculated airflow velocity value of the at least one grid cell within the second set of the plurality of grid cells with the calculated buoyant airflow velocity values to correct for the airflow pattern effects from the buoyancy forces;

store on a storage device, the calculated jet airflow velocity values, the calculated airflow velocity values of the first set of grid cells, each calculated airflow velocity value not subsequently modified, and the at least one modified airflow velocity value; and control at least one of airflow associated with one or more cooling providers and power associated with one or more equipment racks in the facility based on at least one of the calculated jet airflow velocity values, the calculated airflow velocity values of the first set of grid cells, each calculated airflow velocity value not subsequently modified, and the at least one modified airflow velocity value.

17. The method according to claim 1, wherein the airflow velocity value of the first set of grid cells is based at least in part on a distance between the at least one grid cell and a floor of the facility.

18. The system according to claim 9, wherein the airflow velocity value of the first set of grid cells is based at least in part on a distance between the at least one grid cell and a floor of the facility.

* * * * *